(12) United States Patent
Ishihara et al.

(10) Patent No.: US 7,284,723 B2
(45) Date of Patent: *Oct. 23, 2007

(54) RECORDING TAPE CARTRIDGE

(75) Inventors: Yusuke Ishihara, Kanagawa (JP);
Kazuo Hiraguchi, Kanagawa (JP);
Wataru Iino, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 56 days.

This patent is subject to a terminal disclaimer.

(21) Appl. No.: 10/784,716

(22) Filed: Feb. 24, 2004

(65) Prior Publication Data

US 2004/0164199 A1 Aug. 26, 2004

(30) Foreign Application Priority Data

Feb. 24, 2003 (JP) ............................. 2003-046131

(51) Int. Cl.
*G11B 23/07* (2006.01)
(52) U.S. Cl. ...................................... 242/348; 360/132
(58) Field of Classification Search ............. 242/338.1, 242/343, 348, 348.2; 360/132
See application file for complete search history.

(56) References Cited

U.S. PATENT DOCUMENTS

| | | | |
|---|---|---|---|
| 5,901,916 A | 5/1999 | McAllister et al. | |
| 6,234,416 B1 | 5/2001 | Nayak | |
| 6,581,866 B2 | 6/2003 | Tsuyuki et al. | |
| 6,680,818 B1 | 1/2004 | Morita et al. | |
| 7,059,554 B2 * | 6/2006 | Hiraguchi et al. | ....... 242/338.1 |
| 7,100,857 B2 | 9/2006 | Ishihara et al. | |

FOREIGN PATENT DOCUMENTS

| | | |
|---|---|---|
| EP | 0 284 687 A2 | 10/1988 |
| JP | 63-251983 A | 10/1988 |
| JP | 11-185437 A | 7/1999 |
| JP | 11-273305 A | 10/1999 |
| JP | 2000-067560 A | 3/2000 |
| JP | 3187022 B2 | 5/2001 |
| JP | 2002-190177 A | 7/2002 |

* cited by examiner

*Primary Examiner*—John Q. Nguyen
(74) *Attorney, Agent, or Firm*—Sughrue Mion, PLLC

(57) ABSTRACT

In a recording tape cartridge, a reel has a reel hub around which a magnetic tape is wound. An annular reel gear is formed at an outer surface of a bottom portion of the reel hub. Rotation of the reel is impeded by a braking member engaging with an engaging gear formed at an inner surface of the bottom portion. When a clutch member is pressed by a rotating shaft of a drive device, the clutch member is guided by rotation restricting ribs which are engaged with rotation restricting grooves such that relative rotation is impossible, and the clutch member moves in an axial direction of the reel and cancels engagement of the braking member with the engaging gear. A press operation surface and the rotation restricting grooves are positioned further toward a radial direction inner side than the reel gear.

17 Claims, 13 Drawing Sheets

RECORDING TAPE CARTRIDGE

CROSS-REFERENCE TO RELATED APPLICATION

This application claims priority under 35 USC 119 from Japanese Patent Application No. 2003-46131, the disclosure of which is incorporated by reference herein.

BACKGROUND OF THE INVENTION

1. Field of the Invention

The present invention relates to a recording tape cartridge which rotatably accommodates a reel on which a recording tape, such as a magnetic tape or the like, is wound.

2. Description of the Related Art

Recording tapes such as magnetic tapes and the like are used as external recording media for computers and the like. Little space is required to accommodate such a recording tape at the time of storage thereof, and a large amount of information can be recorded thereon. A so-called single-reel recording tape cartridge is used in which a single reel, on which the recording tape is wound, is rotatably accommodated within a case. Such a recording tape cartridge is equipped with a braking means so that the reel does not rotate within the case when the recording tape cartridge is not in use. (See, for example, Japanese Patent Application Laid-Open (JP-A) No. 63-251983.) A recording tape cartridge equipped with such a braking means will be described with reference to FIG. 11.

In a recording tape cartridge 200 illustrated in FIG. 11, a single reel 204 is accommodated within a case 202. The case 202 has a gear opening 206 provided at the central portion of a floor plate 202A, and a rotation restricting rib 208 projecting downwardly from a ceiling plate 202B.

The reel 204 has a reel hub 210 which is formed in the shape of a hollow cylinder having a bottom, and around whose outer peripheral portion a recording tape is wound. A reel gear 214, which can mesh with a driving gear 212A formed at a rotating shaft 212 of a drive device, is formed in an annular form at the bottom surface (the outer side) of a bottom portion 210A of the reel hub 210. On the other hand, an engaging gear 216 is formed in an annular form at the top surface (the inner side) of the bottom portion 210A. A through hole 218 is formed in the axially central portion of the bottom portion 210A. An annular reel plate 219, which is formed of a magnetic material and which has, in the axially central portion thereof, a through hole substantially corresponding to the through hole 218, is fixed to the radial direction inner side of the reel gear 214 at the bottom surface of the bottom portion 210A.

A disc-shaped braking member 220 is provided so as to be inserted within the reel hub 210. A braking gear 220A, which is annular and which can mesh with the engaging gear 216, is provided at the bottom surface of the braking member 220. The rotation restricting rib 208 of the case 202 is inserted in at the inner side of an engaging projection 222, which stands erect from the top surface of the braking member 220, such that the braking member 220 cannot rotate with respect to the case 202 but can move upward and downward. A releasing projection 223, which projects from the axially central portion of the bottom surface of the braking member 220, is disposed in the through hole 218 of the reel hub 210 and faces the gear opening 206.

A compression coil spring 224 is disposed between the braking member 220 and the ceiling plate 202B of the case 202. Usually, the braking member 220 is urged downward by the urging force of the compression coil spring 224 such that the braking gear 220A meshes with the engaging gear 216. In this way, when the recording tape cartridge 200 is not in use, it is set in a rotation locked state in which rotation of the reel 204 with respect to the case 202 is impeded. Further, the reel gear 214 is exposed from the gear opening 206 while the reel 204 is pressed toward the bottom plate 202 side of the case 202 by this urging force.

On the other hand, when the recording tape cartridge 200 is loaded into a drive device, as the driving gear 212A meshes with the reel gear 214, a releasing portion 212B, which projects from the axially central portion of the rotating shaft 212, abuts the releasing projection 223 of the braking member 220 and pushes the releasing projection 223. In this way, the braking member 220 is pushed upward against the urging force of the compression coil spring 224, and the meshing of the braking gear 220A and the engaging gear 216 is cancelled. In the state in which the driving gear 212A and the reel gear 214 are completely meshed together, the reel plate 219 of the reel 204 is attracted by the magnetic force of an annular magnet 212C provided between the driving gear 212A and the releasing portion 212B of the rotating shaft 212. The reel 204 becomes able to rotate within the case 202 while the aforementioned meshing is maintained.

Then, when the rotating shaft 212 rotates around the axial center thereof, the reel 204 rotates integrally therewith. At this time, due to the fact that the braking member 220 cannot rotate with respect to the case 202, the releasing projection 223 and the releasing portion 212B slidingly contact one another. In order to lessen the sliding contact resistance, the releasing projection 223 of the braking member 220 is formed of a resin material, and the releasing portion 212B at the drive device also is formed of a resin material.

However, the recording tape cartridge 200 having the above-described structure has the following problematic points. First, as the reel 204 rotates, the releasing projection 223 and the releasing portion 212B slidingly contact one another. Therefore, if the rotational speed of the reel 204 is high or if the period of time over which the reel 204 is rotated continuously is long, wear will occur at one or both of the releasing projection 223 and the releasing portion 212B. In this case, if wear arises at the releasing projection 223, it is possible to handle the problem by replacing the part. However, if wear arises at the releasing portion 212B at the drive device, repair is complex and the repair costs are expensive.

Secondly, because the releasing projection 223 which is relatively large projects from the bottom surface of the braking member 220, the center of gravity of the braking member 220 overall is high (a state such as a top), and when the reel 204 rotates, it may shake greatly due to the slight offset of the center thereof. Such shaking is a cause of the generation of dust due to abrasion which is caused by the abnormal contact between the engaging projection 222 and the rotation restricting rib 208, and is a cause of promoting wear of the releasing projection 223 or the releasing portion 212B. In order to prevent this, the distal end of the releasing projection 223 is formed as a flat surface 223A which planarly contacts the releasing portion 212B. However, in order to reduce the aforementioned sliding contact resistance, the surface area of the flat surface 223A is extremely small, and is insufficient to prevent the aforementioned shaking. Moreover, when the height over which the releasing projection 223 projects is low, the releasing portion 212B at the drive device must be made to be long. The relative stroke in the axial direction at the time when the reel gear 214 and the driving gear 212A mesh together is long, which is a cause of an increase in the size of the drive device.

Third, due to requirements relating to strength, durability and the like, the rotating shaft 212 is formed of a metal material. The releasing portion 212B, which is formed of a resin material in correspondence with the braking member 220 as described above, is mounted to the rotating shaft 212. Because the magnet 212C is disposed around the releasing portion 212B, the releasing portion 212B cannot be fixed from above (from the recording tape cartridge 200 side). Therefore, as illustrated, the releasing portion 212B is fixed to the rotating shaft 212 by a screw from the side of the drive source such as a motor or the like. There are therefore constraints on the layout of the motor and the like within the drive device. Namely, the degrees of freedom in the design of the drive device into which the recording tape cartridge 200 is loaded are limited.

Thus, a structure is known in which a releasing member is interposed between the braking member 220 and the rotating shaft 212. (Refer to Japanese Patent Application Laid-Open (JP-A) No. 11-185437 and Japanese Patent No. 3187022 for example.) In the structure of JP-A No. 11-185437, the releasing member is provided for the purpose of dustproofing. The releasing member is formed of a resin material, and is able to rotate relative to both the braking member and the reel. Therefore, this is not a structure which overcomes the above-described problems. On the other hand, in the structure of Japanese Patent No. 3187022, a releasing member is provided as a countermeasure to the above-described problems. Therefore, portions of this structure which differ from the recording tape cartridge 200 will be described with reference to FIGS. 12 and 13.

A recording tape cartridge 250 shown in FIG. 12 has a releasing member 252 which is disposed between the bottom portion 210A of the reel hub 210 and the braking member 220 and which is formed of a resin material. As shown in FIG. 13, the releasing member 252 is formed substantially in the shape of an equilateral triangle as seen in plan view, and has leg portions 254 projecting downward from the vertices thereof. Each leg portion 254 is inserted in an insert-through hole 256 provided in the bottom portion 210A instead of the through holes 218, and faces the gear opening 206.

The insert-through holes 256 pass through the region of the bottom portion 210A where the reel gear 214 is formed, and the diameters thereof are larger than the gear pitch of the reel gear 214. Moreover, teeth of the reel gear 214 are not provided around the insert-through holes 256. Moreover, at the top surface of the bottom portion 210A, in place of the engaging gear 216, a plurality of anchor projections 258 are provided. The anchor projections 258 are disposed at uniform intervals along a predetermined circumference which is coaxial with the reel hub 210, so as to avoid the vertices of the releasing member 252. Gear teeth 258A, which can mesh with the braking gear 220A, are formed at the top ends of the anchor projections 258.

A slide-contact projection 260 projects from the axially central portion of the top surface of the releasing member 252. The slide-contact projection 260 always abuts a slide-contact projection 262 which is provided in place of the releasing projection 223 at the braking member 220.

When this recording tape cartridge 250 is not in use, due to the braking gear 220A of the braking member 220 meshing with the gear teeth 258A of the reel 204 due to the urging force of the compression coil spring 224, rotation of the reel 204 with respect to the case 202 is impeded. In this state, the releasing member 252 abuts the braking member 220 at the slide-contact projection 260, and the bottom surface of the releasing member 252 is pressed against the bottom portion 210A. The end surfaces of the leg portions 254, which are positioned within the insert-through holes 256, are substantially flush with the addenda of the reel gear 214.

On the other hand, when the recording tape cartridge 250 is loaded into a drive device, as the reel gear 214 meshes with the driving gear 212A of the rotating shaft 212 which does not have the releasing portion 212B, the leg portions 254 are pressed by the driving gear 212A, and the releasing member 252 is pushed upward against the urging force of the compression coil spring 224. Thus, the releasing member 252, while moving away from the bottom portion 210A, pushes the braking member 220 upward, and the meshing of the braking gear 220A and the gear teeth 258A is released. In the state in which the meshing of the driving gear 212A and the reel gear 214 is maintained, the releasing member 252 holds the braking member 220 at the above-described released position, due to the leg portions 254 contacting the driving gear 212A.

Then, when the rotating shaft 212 rotates, the reel 204 rotates within the case 202. At this time, the releasing member 252, whose leg portions 254 are in the insert-through holes 256 of the reel 204, rotates integrally with the reel 204, and the slide-contact projection 260 slidingly contacts the slide-contact projection 262 of the braking member 220.

As described above, in the recording tape cartridge 250, the releasing member 252, which, at the leg portions 254 thereof, is abutting the addenda of the driving gear 212A of the rotating shaft 212, rotates integrally with the reel 204. Therefore, there are no portions at the drive device and at the recording tape cartridge 250 which slidingly contact one another as the reel 204 rotates, and there is no fear that a member at the drive device will become worn. Moreover, by interposing the releasing member 252 between the rotating shaft 212 and the braking member 220, the position of the center of gravity of the braking member 220 is lowered, and shaking of the braking member 220 at the time when the reel 204 rotates is suppressed. In particular, the releasing member 252 is pressed by the rotating shaft 212 at the leg portions 254 which are disposed so as to be separated from the axial center of the reel 204. Thus, the posture of the releasing member 252 at the time when the reel 204 rotates is stable, and it is difficult for the releasing member 252 to become a cause of shaking of the braking member 220. Moreover, because the rotating shaft 212 pushes the releasing member 252 by the driving gear 212A, there is no need to provide the releasing portion 212B which is made of resin. The structure of the recording tape cartridge 250 does not place any constraints on the layout of the motor or the like of the drive device. Note that illustration of the magnet 212C is omitted from FIG. 12.

However, even with the conventional recording tape cartridge 250 as described above, there are problems such as follows.

First, the leg portions 254 of the releasing member 252 which is made of resin are pushed by the addenda of the driving gear 212A which is made of metal, and the releasing member 252 moves the braking member 220 to a rotation permitted position and holds the braking member 220 thereat. Therefore, even if there is no sliding contact accompanying rotation at these times, wear will arise at the leg portions 254 due to use over a long period of time (i.e., repetition of the aforementioned pushing).

Second, the releasing member 252 is moved upward by the driving gear 212A which meshes with the reel gear 214.

Therefore, the stroke of movement of the releasing member 252 is restricted by the height of the teeth of the reel gear 214 (the driving gear 212A), and it is difficult to ensure a releasing stroke that has leeway. In particular, when wear arises at the leg portions 254 as described above, there is the concern that the stroke of the releasing member will be reduced, and that releasing of the locking of the reel 204 will not be able to be achieved. If the leg portions 254 are made to project further than the addenda of the reel gear 214 as a countermeasure thereto, there is the concern that the locking of the reel 204 will be released when the recording tape cartridge 250 is not in use.

Third, usually, the reel gear 214 is formed on the whole in the shape of a ring having a large diameter, in order to make the driving force from the rotating shaft 212 small. Namely, at the bottom portion 210A, the reel gear 214 is disposed as far as possible from the axial center. On the other hand, in order to ensure the braking force of the braking member 220, the anchor projections 258 having the gear teeth 258A are disposed on a circumference which has as large of a diameter as possible. Namely, the reel gear 214 and the anchor projections 258 are disposed at substantially the same position in the vertical direction, or the reel gear 214, which is formed at the outer surface side, is disposed slightly further toward the radial direction outer side than the anchor projections 258. Therefore, in order for the anchor projections 258 to not interfere with the vertices of the releasing member 252 (portions corresponding to the region where the reel gear 214 is formed), the anchor projections 258 cannot be provided continuously in the form of a ring. Accordingly, the anchor projections 258 must be provided at discrete positions. As compared with the above-described engaging gear 216 which is provided in an annular form, the centering function (centripetal force) of the braking member 220 due to the meshing is weak. Due to the centering function being weak, at the recording tape cartridge 250, it is easy for the braking member 220 to ride up on the gear teeth 258A in particular at the time of assembling the braking member 220, and careful work (in an automatic assembling device, high-level monitoring) is required. Moreover, at the reel gear 214 as well, similarly, the insert-through holes 256 are not continuous in the peripheral direction. Therefore, the centering function is weak, and the torque which can be transmitted from the rotating shaft 212 is small.

Fourth, because the releasing member 252 is disposed within the reel hub 210, the rotation locked position of the braking member 220, which is disposed so as to be separated from the bottom portion 210A, is higher by an amount corresponding to the thickness of the releasing member 252, and there is the possibility that the braking of the reel 204 by the braking member 220 will not be stable. Further, because the rotation locked position is high, the height by which the anchor projections 258 project from the bottom portion 210A is high as compared with the engaging gear 216, and thick portions are formed at the reel hub 210. In this way, the flowability of the resin at the time of molding the reel hub 210, which is formed by usual resin molding, is poor, which is a cause of deterioration of the moldability.

As described above, there is still room for improving a releasing member for releasing the state in which a reel is locked by a braking member.

SUMMARY OF THE INVENTION

In view of the aforementioned, an object of the present invention is to provide a recording tape cartridge in which locking of a reel by a braking member and releasing of the locking by a releasing member can be reliably carried out, and which can suppress structural constraints by providing the releasing member.

In order to achieve the above-described object, a recording tape cartridge relating to a first aspect of the present invention comprises: a reel rotatably accommodated within a case, a recording tape being wound around an outer peripheral portion of a reel hub which is formed in a shape of a cylindrical tube having a bottom portion; an engaging portion provided at an inner surface of the bottom portion of the reel hub; a reel gear which is annular, and which is provided coaxially at an outer surface of the bottom portion of the reel hub, and which can mesh with a driving gear of a drive device; a braking member, provided so as to be unable to rotate within the case, able to move to a rotation locked position at which the braking member engages with the engaging portion by closing to the bottom portion of the reel hub, and to a rotation permitted position, at which an engaged state with the engaging portion is released by being away from the bottom portion of the reel hub; a releasing member having a main body portion positioned within the reel hub, and an operation portion provided at the main body portion and exposed, from a position further toward a radial direction inner side than the reel gear at the bottom portion of the reel hub, to an exterior, the releasing member moving the braking member to the rotation permitted position by the operation portion being pushed by a releasing portion of a drive device; a guide portion provided, at the bottom portion of the reel hub, further toward the radial direction inner side than the reel gear; and a guide member, provided at the releasing member, for guiding the releasing member in a moving direction along an axial direction of the reel by engaging with the guide portion, and for impeding rotation of the releasing member with respect to the reel.

In the recording tape cartridge of the first aspect, when the braking member, which is unable to rotate with respect to the case, is positioned at the rotation locked position at which the braking member engages with the engaging portion provided at the bottom portion of the reel hub, the reel is in a rotation locked state in which rotation of the reel with respect to the case is impeded. Further, the operation portion of the releasing member is exposed to the exterior so as to be able to be pressed by the releasing portion of a drive device. Note that, for example, the releasing member may on the whole be positioned within the reel hub and the operation portion may face the gear opening from a pass-through hole formed in the reel hub. Or, a portion of the releasing member, which portion includes the operation portion, may enter into the pass-through hole or pass through the pass-through hole.

On the other hand, when the reel is to be rotated (i.e., when the recording tape cartridge is to be used), the releasing portion of the drive device pushes the operation portion of the releasing member. Due to this pushing force, the releasing member moves toward the braking member while being guided in the moving direction along the axial direction of the reel by the guide member which engages with the guide portion of the reel. The releasing member moves the braking member to the rotation permitted position (moves the braking member away from the bottom portion) while abutting the braking member at the main body portion. In this way, the state in which rotation of the reel is locked by the braking member is cancelled. Moreover, when the driving gear which is meshed with the reel gear rotates while the releasing member maintains the aforementioned state of abutment and holds the braking member at the rotation permitted position, the reel rotates together with the releasing member, whose rotation with respect to the reel is impeded by the guide member, and the operation portion and the releasing portion do not slidingly contact one another.

Here, the guide member which engages with the guide portion is provided at the releasing member. Therefore, when the releasing member is pushed by the releasing portion of the drive device, the releasing member is reliably operated and releases the rotation locked state of the reel. Further, the guide portion, which engages with the guide member, is provided at the bottom portion of the reel hub, further toward the radial direction inner side than the reel gear. The operation portion of the releasing member is exposed to the exterior at a region further toward the radial direction inner side than the reel gear. Therefore, there is no need to provide, at the reel gear, discontinuous portions for operating and guiding the releasing member, and the reel gear can be formed continuously in an annular form. In this way, for example, the torque transmitted from the driving gear can be improved, and the strength with respect to the torque can be ensured.

In addition, because the releasing portion of the drive device is not the driving gear which meshes with the reel gear, the stroke of movement of the releasing member is not restricted by the height of the teeth of the reel gear (the driving gear), and a sufficient release stroke for releasing the locking of the reel by the braking member can be ensured. Further, there are no constraints on the configuration of the releasing portion of the drive device, and the releasing portion can be made to be a configuration such that wear due to the aforementioned pushing does not arise. In particular, because the operation portion of the releasing member and the releasing portion of the drive device do not slidingly-contact one another, at the drive device, there are no structural constraints due to particular countermeasures, such as forming the releasing portion of a resin material as in the conventional art.

In this way, in the recording tape cartridge of the first aspect, the locking of the reel by the braking member and the releasing of the locking by the releasing member can be carried out reliably, and structural constraints due to the provision of the releasing member can be suppressed.

Note that the guide member of the first aspect may be formed integrally with the operation portion (i.e., a structure may be used in which the operation portion carries out the function of the guide member). Or, the guide member may be provided separately from the operation portion (so as to function independently thereof).

A recording tape cartridge relating to a second aspect of the present invention is characterized in that, in the recording tape cartridge of the first aspect, the guide member is an engaging piece protruding (jutting out) from the main body portion toward a radial direction outer side, and the guide portion is a guide groove in which the engaging piece enters and which is long along the moving direction.

In the recording tape cartridge of the second aspect, the engaging piece (the guided portion as the guide member), which juts outwardly in the radial direction from the main body portion of the releasing member, enters into the guide groove (the guide portion) which is provided at the reel hub and which is long along the moving direction of the releasing member. In this way, with a simple structure, movement of the releasing member other than the reciprocating movement in the above mentioned moving direction is restricted. Further, as compared with a structure in which a through hole which passes through the bottom portion of the reel hub is used as the guide portion, there are few constraints on the guide stroke, and the degrees of freedom in design are improved. Therefore, for example, the stroke for releasing the locked state of the reel by the releasing member can be made large, or the guide member can be provided separately from the operation portion and accommodated within the reel hub together with the guide portion.

A recording tape cartridge relating to a third aspect of the present invention is characterized in that, in the recording tape cartridge of the second aspect, three or more of each of the engaging piece and the guide groove are provided at respectively different positions in a peripheral direction.

In the recording tape cartridge of the third aspect, the guide member is structured by respectively different engaging pieces entering into three guide grooves provided at uniform intervals in the peripheral direction of the reel. Clearances, which are for permitting relative movement in the moving direction between the engaging pieces and the guide grooves, are provided between the engaging pieces and the guide grooves. By providing three or more of each of the engaging pieces and the guide grooves at respectively different positions in the peripheral direction, the difference in the minimum clearances in the respective directions orthogonal to the axis of the reel (i.e., the amounts over which the releasing member can move) is small. In other words, even if the releasing member attempts to move in the direction in which one of the engagement pieces is jutting out (a direction orthogonal to the clearance), the other engaging pieces engage with the groove walls of the guide grooves such that the amount of movement of releasing member can be kept small. Therefore, the displacement of the releasing member in the aforementioned respective directions is suppressed. For example, shaking of the braking member, which rotates relatively while abutting at the time when the reel rotates, is suppressed, and wear between the releasing member and the braking member is suppressed.

Moreover, at the time when the reel is rotating, the torque transmitted from the reel is received by the respective engaging pieces. Therefore, the stress which is applied to each of the engaging pieces is mitigated. In particular, if a structure is employed in which the engaging pieces are disposed at uniform intervals in the peripheral direction, the torque which each engaging piece receives is uniform, and the posture of the releasing member is stable.

A recording tape cartridge relating to a fourth aspect of the present invention is characterized in that, in the recording tape cartridge of the second aspect or the third aspect, the operation portion is exposed to the exterior from a pass-through hole formed in an axially central portion of the bottom portion of the reel hub, and the main body portion has a base portion which can pass through the pass-through hole and at which the operation portion and the engaging piece are provided, and a stopper portion protruding (jutting) outwardly in a radial direction from the base portion separately from the engaging piece and engageable with the bottom portion of the reel hub.

In the recording tape cartridge of the fourth aspect, a pass-through hole is provided in the axially central portion of the bottom portion of the reel hub. The operation portion, which is provided at the base portion which structures the main body portion of the releasing member and can pass through the pass-through hole, is exposed to the exterior from the pass-through hole. Namely, in the present structure, there is one operation portion, and it is formed integrally with the base portion which can pass through the pass-through hole. The engaging piece which structures the guide member, and the stopper portion which is provided separately from (independently of) the engaging piece, respectively jut outwardly in the radial direction from the base portion. Due to the stopper portion of the main body portion engaging with the bottom portion of the reel hub, falling-out of the releasing member from the reel hub is impeded. Namely, positioning at the time when the braking member is positioned at the rotation locked position (i.e., when the braking member is not being pressed by the releasing portion of the drive device) is carried out.

In this way, the releasing member is structured such that the guiding function (rotation restricting function) by the guide member of the releasing member and the positioning function of the releasing member (the function of restricting the permitted movement in the moving direction) are structured separately. Therefore, there are no constraints on achieving both of these functions. As a result, it is easy to form the engaging piece and the stopper portion in configurations appropriate for these functions, and it is easy to improve the both functions. Moreover, because the operation portion is disposed at the axially central portion of the reel hub, in a case in which, for example, a magnetic plate or the like which is attracted by a magnet at the drive device is disposed at the outer surface of the bottom portion, it is possible to achieve a structure in which the holding force due to this attraction is not reduced.

A recording tape cartridge relating to a fifth aspect of the present invention is characterized in that, in the recording tape cartridge of the fourth aspect, three or more of the stopper portions are provided at uniform intervals in the peripheral direction.

In the recording tape cartridge of the fifth aspect, three or more stopper portions are provided at uniform intervals in the peripheral direction. Therefore, the posture of the releasing member in the aforementioned positioned state is stable. As a result, the braking member can be reliably and stably moved by the releasing member such that the locked state of the reel is released.

A recording tape cartridge relating to a sixth aspect of the present invention is characterized in that, in the recording tape cartridge of the fourth or fifth aspect, the engaging piece is thinner than the stopper portion.

In the recording tape cartridge of the sixth aspect, the engaging piece, of which dimensional accuracy (accuracy of the slide surface which slides along the guide groove) in the direction of thickness is required in order to achieve the aforementioned guiding function, is formed to be thinner than the stopper portion of which accuracy in the direction of thickness is not required. Therefore, in a case in which the releasing member which has the engaging piece is formed by resin molding, the dimensional accuracy of the engaging piece is ensured, and the stopper portion is made to be thick such that it is easy to ensure the rigidity of the stopper portion.

Because the thickness of the engaging piece and the thickness of the stopper portion are different, even if the same number of engaging pieces and stopper portions are provided at the same intervals, it is possible to prevent the stopper portion from being mistakenly inserted into the guide groove.

A recording tape cartridge relating to a seventh aspect of the present invention is characterized in that, in the recording tape cartridge of the sixth aspect, a length, in the moving direction, of the engaging piece is longer than a length, in the moving direction, of the stopper portion.

In the recording tape cartridge of the seventh aspect, the length, in the moving direction, of the engaging piece which is formed to be thin as described above, is longer than the corresponding length of the stopper portion. Therefore, the amount of engagement of the engaging piece with the guide groove is large. The guiding ability of the releasing member is improved, and the stress applied to the thin engaging piece at the time when the reel rotates can be mitigated. On the other hand, the thick stopper portion is made to be short, and it is possible to prevent a deterioration in resin flowability at the time when being formed by resin molding.

A recording tape cartridge relating to an eighth aspect of the present invention is characterized in that, in the recording tape cartridge of the first aspect or the second aspect, the engaging portion is provided along a circumference which is coaxial with the reel, and the releasing member and the guide portion are disposed at a radial direction inner side of the engaging portion.

In the recording tape cartridge of the eighth aspect, the releasing member and the guide portion of the reel are disposed at the radial direction inner side of the engaging portion which is provided along a circumference which is coaxial with the reel hub. Therefore, the engaging portion can be formed in a continuous annular form, and for example, the ability of the braking member to brake the reel is improved.

A recording tape cartridge relating to a ninth aspect of the present invention is characterized in that, in the recording tape cartridge of the eighth aspect, a tubular portion, into which the releasing member and the guide portion enter, is provided at an axially central portion of the braking member at the radial direction inner side of the engaging portion.

In the recording tape cartridge of the ninth aspect, the releasing member and the guide portion (at least one portion thereof in the moving direction) enter into the tubular portion provided at the axially central portion of the braking member. Therefore, constraints on the height of engagement of the braking member and the engaging portion, which constraints would be due to the provision of the releasing member, are eliminated. As a result, it is possible to dispose the releasing member while keeping the position of engagement between the braking member and the engaging portion low.

In a recording tape cartridge of a tenth aspect, a stopper groove portion, provided at the bottom portion of the reel hub, further toward the radial direction inner side than the reel gear, is provided, and the stopper groove portion being a groove in which the stopper portion enters and which is long along the moving direction.

In a recording tape cartridge of an eleventh aspect, a clearance between the stopper groove portion and the stopper portion in a state of engaging are larger than a clearance between the guide groove and the engaging piece in a state of engaging.

A twelfth aspect of the present invention is a recording tape cartridge comprising: a reel rotatably accommodated within a case, a recording tape being wound around an outer peripheral portion of a reel hub which is formed in a shape of a cylindrical tube having a bottom portion; an engaging portion provided at an inner surface of the bottom portion of the reel hub; a reel gear which is annular, and which is provided coaxially at an outer surface of the bottom portion of the reel hub, and which can mesh with a driving gear of a drive device; a braking member, provided so as to be unable to rotate within the case, able to move to a rotation locked position at which the braking member engages with the engaging portion by closing to the bottom portion of the reel hub, and to a rotation permitted position, at which an engaged state with the engaging portion is released by being away from the bottom portion of the reel hub; a releasing member having a main body portion positioned within the reel hub, and an operation portion provided at the main body portion and exposed, from a position further toward a radial direction inner side than the reel gear at the bottom portion of the reel hub, to an exterior, the releasing member moving the braking member to the rotation permitted position by the operation portion being pushed by a releasing portion of a drive device; a boss portion, provided at the inner surface of the bottom portion of the reel hub, further toward the radial direction inner side than the reel gear, which includes a hole, the operation portion of the releasing member being able to pass through the hole and expose to the exterior of the outer surface of the reel hub; and a guide member, provided at the releasing member, for guiding the releasing member in a moving direction along an axial direction of the reel by engaging. with the boss portion, and for impeding rotation of the releasing member with respect to the reel.

In a recording tape cartridge of a thirteenth aspect according to the twelfth aspect, the guide member is an engaging piece protruding from the main body portion toward a radial direction outer side, and a groove, in which the engaging piece enters and which is long along the moving direction, is formed at the hole of the boss portion.

In a recording tape cartridge of a fourteenth aspect according to the thirteenth aspect, a plurality of the engaging pieces and the grooves are provide at different positions in peripheral directions of the releasing member and the hole of the boss portion, respectively.

A fifteenth aspect of the present invention is a recording tape cartridge comprising: a reel rotatably accommodated within a case, a recording tape being wound around an outer peripheral portion of a reel hub which is formed in a shape of a cylindrical tube having a bottom portion; an engaging portion provided at an inner surface of the bottom portion of the reel hub; a reel gear which is annular, and which is provided coaxially at an outer surface of the bottom portion of the reel hub, and which can mesh with a driving gear of a drive device; a braking member, provided so as to be unable to rotate within the case, able to move to a rotation locked position at which the braking member engages with the engaging portion by closing to the bottom portion of the reel hub, and to a rotation permitted position, at which an engaged state with the engaging portion is released by being away from the bottom portion of the reel hub; a releasing member, having a main body portion and an operation portion provided at the main body portion, provided within the reel hub, further toward a radial direction inner side than the reel gear at the bottom portion of the reel hub, the releasing member moving the braking member to the rotation permitted position by the operation portion being pushed by a releasing portion of a drive device; a guide portion provided, at the bottom portion of the reel hub, further toward the radial direction inner side than the reel gear; and a guide member, provided at the releasing member, for guiding the releasing member in a moving direction along an axial direction of the reel by engaging with the guide portion, and for impeding rotation of the releasing member with respect to the reel.

BRIEF DESCRIPTION OF THE DRAWINGS

FIG. 1A is a perspective view as seen from above and FIG. 1B is a perspective view as seen from below.

FIG. 9A is a plan view and FIG. 9B is a sectional view.

DETAILED DESCRIPTION OF THE INVENTION

A recording tape cartridge 10 relating to an embodiment of the present invention will be described on the basis of FIGS. 1 through 10.

Figure 1A:
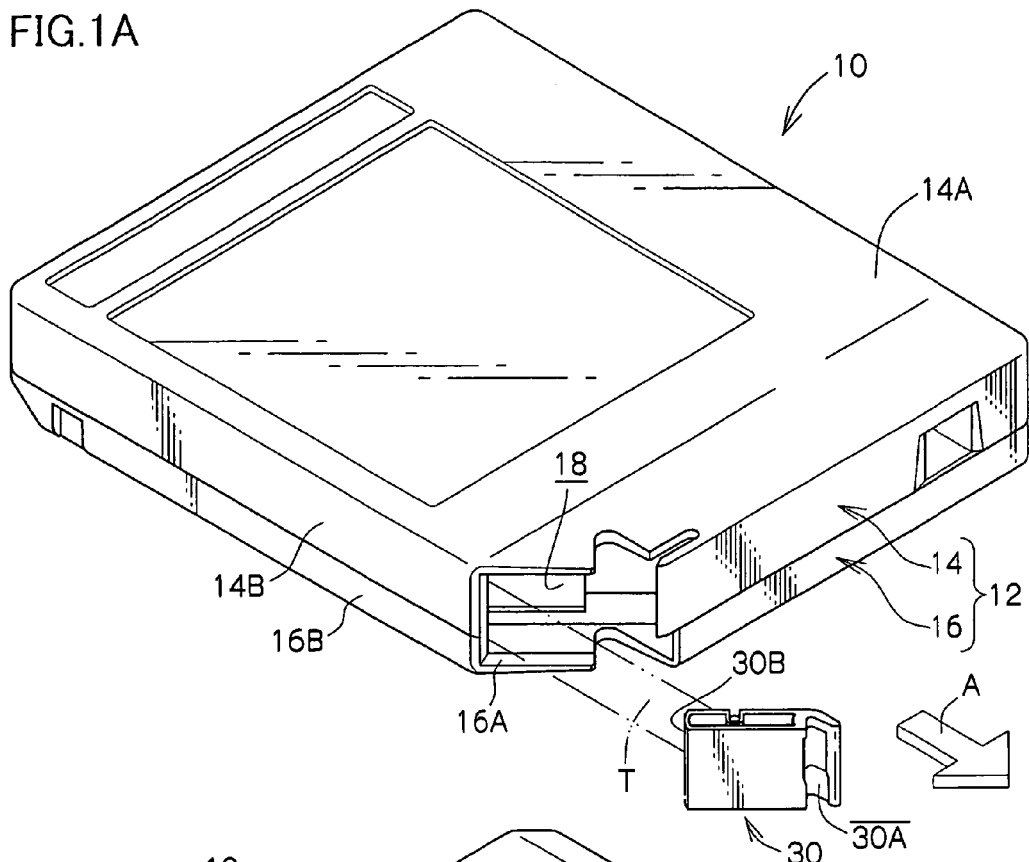
FIGS. 1A and 1B illustrate the external appearance of a recording tape cartridge relating to an embodiment of the present invention, where
Figure 1B:
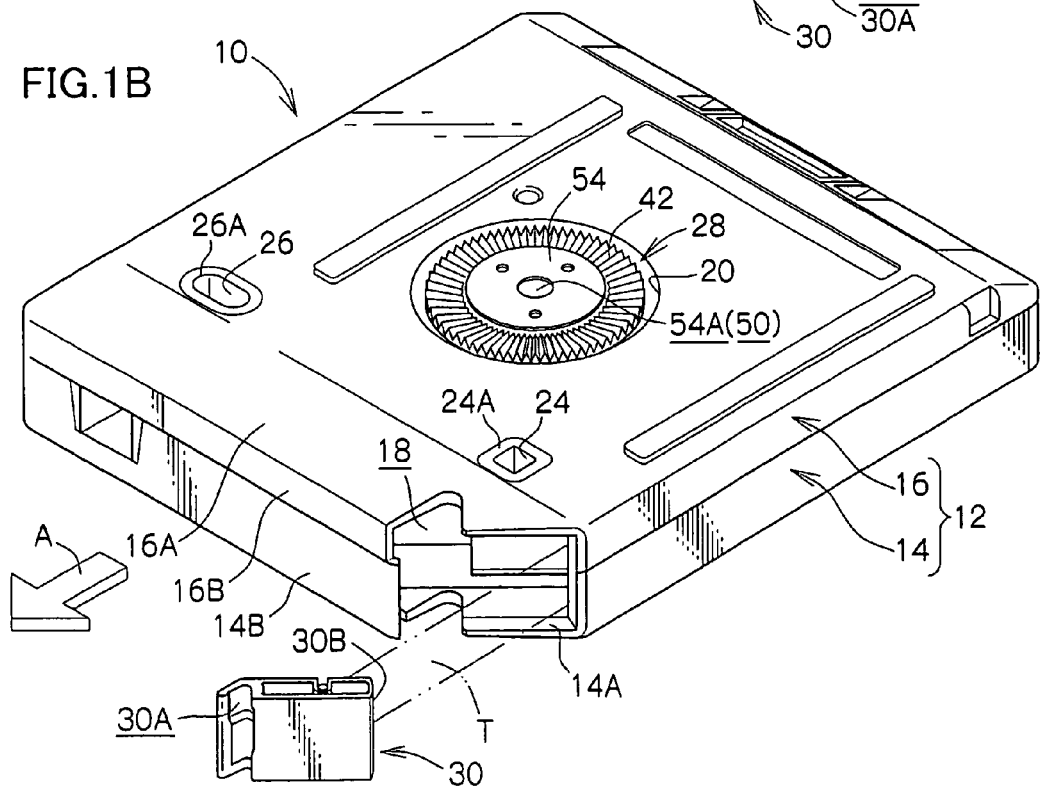
Figure 2:
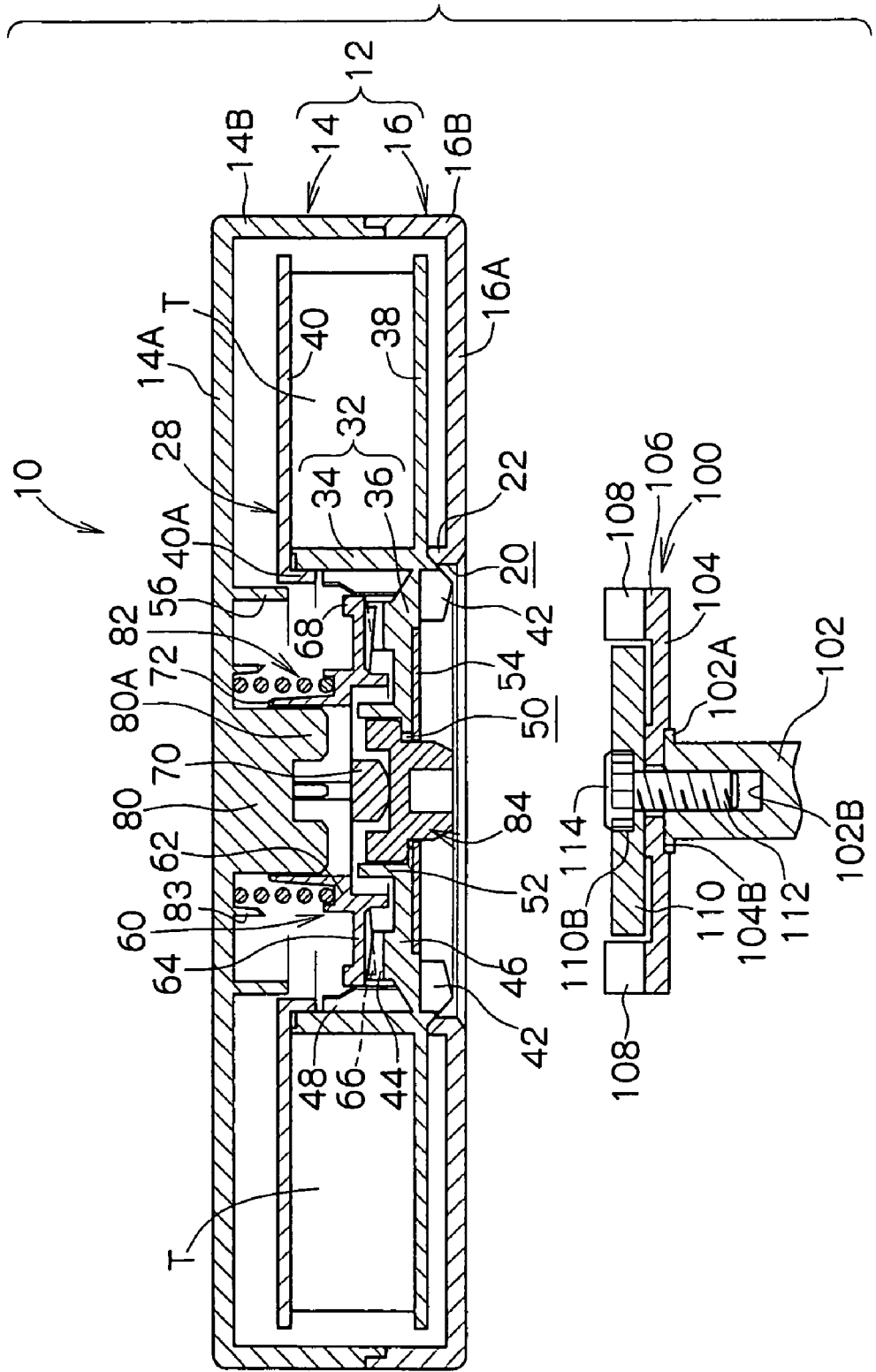
FIG. 2 is a sectional view at a time when rotation of a reel is locked in the recording tape cartridge relating to the embodiment of the present invention.

FIG. 1A is a perspective view, as seen from above and at an angle, of the recording tape cartridge 10. FIG. 1B is a perspective view, as seen from below and at an angle, of the recording tape cartridge 10. A sectional view of the recording tape cartridge 10 is shown in FIG. 2. Note that arrow A shown in FIG. 1 denotes the direction of loading the recording tape cartridge 10 into a drive device, and for convenience of explanation, the side in the direction of arrow A is the front side.

As shown in these drawings, the recording tape cartridge 10 has a case 12. The case 12 is structured by an upper case 14 and a lower case 16 being joined together. Specifically, the upper case 14 is structured such that a substantially frame-shaped peripheral wall 14B stands erect along the outer edge of a ceiling plate 14A which is substantially rectangular in plan view. The lower case 16 is structured such that a peripheral wall 16B stands erect along the outer edge of a floor plate 16A which has a configuration substantially corresponding to that of the ceiling plate 14A. The case 12 is formed in a substantial box shape by the upper case 14 and the lower case 16 being joined together by ultrasonic welding or screws or the like in a state in which an open end of the peripheral wall 14B and an open end of the peripheral wall 16B abut one another.

At a corner portion of the case 12 at the leading side in the direction of loading the recording tape cartridge 10 into a drive device, the ceiling plate 14A, the peripheral wall 14B, the floor plate 16A and the peripheral wall 16B are respectively cut, such that an opening 18, which is inclined with respect to the loading direction, is formed. A gear opening 20, which is circular and passes through the floor plate 16A, is formed in the substantially central portion of the floor plate 16A. The gear opening 20 is for exposing a reel gear 42 which will be described later. An annular rib 22 projects toward the inner side of the case 12 at the floor plate 16A at the edge of the gear opening 20, and is for positioning a reel 28 which will be described later.

A pair of positioning holes 24, 26 are formed in a vicinity of the front end of the outer surface of the floor plate 16A of the case 12. The pair of positioning holes 24, 26 are formed in the shape of bags within projections (not illustrated) which stand erect from the floor plate 16A toward the interior of the case 12. The positioning holes 24, 26 are disposed so as to be separated from one another on an imaginary line which is orthogonal to the loading direction. The positioning hole 24, which is the positioning hole which is closer to the opening 18, is formed in a substantially square shape, as seen in bottom view, which circumscribes a positioning pin of a drive device. The positioning hole 26 is a long hole whose longitudinal direction runs along the aforementioned imaginary line, and whose width corresponds to the diameter of a positioning pin.

In this way, when the recording tape cartridge 10 is loaded into a drive device and positioning pins are inserted into the respective positioning holes 24, 26, the recording tape cartridge 10 is correctly positioned in the horizontal directions (the left/right direction and the front/back direction) within the drive device.

Positioning surfaces 24A, 26A, which are finished so as to be smoother than the other portions of the floor plate 16A (the design surface of the floor plate 16A), are formed around the positioning holes 24, 26. When the positioning pins are inserted into the positioning holes 24, 26, the positioning surfaces 24A, 26A abut positioning surfaces of the drive device which are provided around the positioning pins. In this way, the vertical direction positioning of the recording tape cartridge 10 within the drive device is carried out.

As shown in FIG. 2, the reel 28, which will be described in detail later, is rotatably accommodated within the above-described case 12. Only one reel 28 is provided. A magnetic tape T serving as a recording tape is wound on the reel 28. A leader block 30, which serves as a pull-out member, is attached to the distal end of the magnetic tape T.

When the recording tape cartridge 10 is not being used, the leader block 30 is accommodated and held at the inner side of the opening 18 of the case 12. In this state, the leader block 30 closes the opening 18, and impedes entry of dust and the like into the case 12. An engaging recess 30A is formed in the distal end of the leader block 30. When the magnetic tape T is to be pulled-out within the drive device, a pull-out means, which engages with the engaging recess 30A, pulls the leader block 30 out of the case 12 and guides the leader block 30 to a take-up reel of the drive device. Moreover, the end surface of the leader block 30 at the side opposite the engaging recess 30A is an arc-shaped surface 30B. The arc-shaped surface 30B is fit into the take-up reel and forms a portion of the take-up surface around which the magnetic tape T is taken-up.

Hereinafter, the reel 28, which is a main portion of the present invention, and the braking means, which is a main portion of the present invention and which impedes rotation of the reel 28 when the recording tape cartridge 10 is not being used, will be described in detail.

Figure 3:
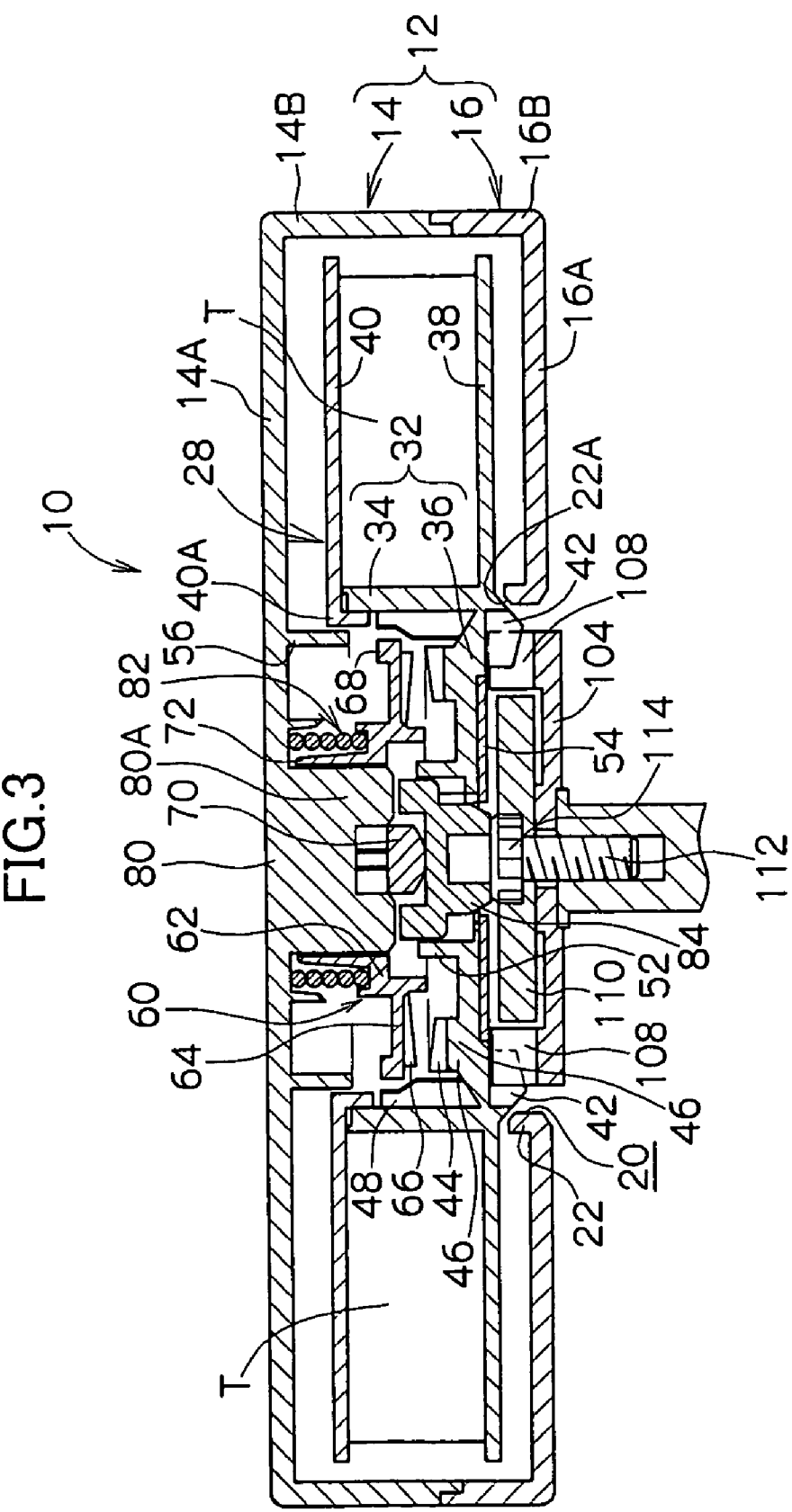
FIG. 3 is a sectional view at a time when locking of rotation of the reel is released in the recording tape cartridge relating to the embodiment of the present invention.
Figure 4:
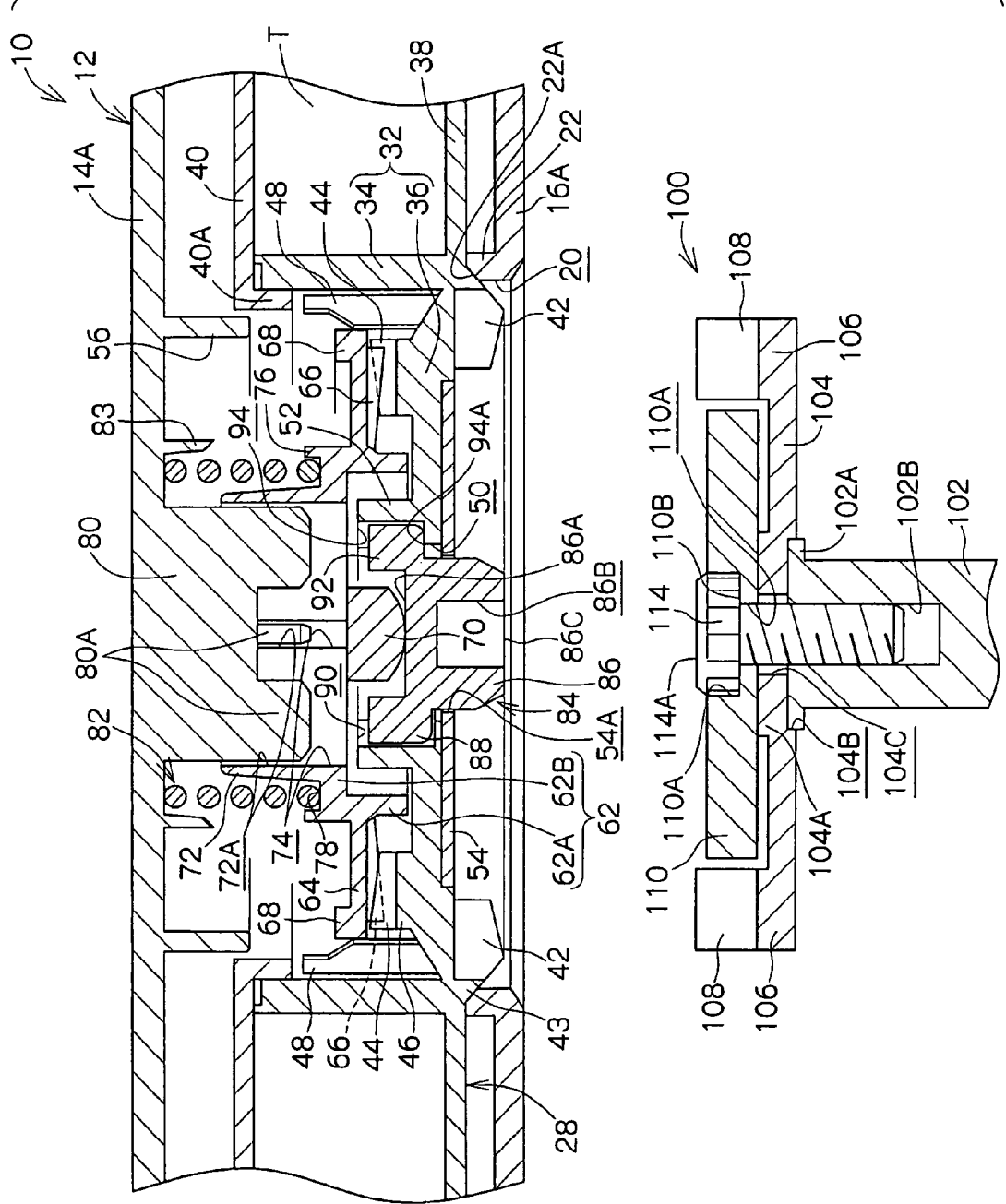
FIG. 4 is an enlarged sectional view of main portions at the time when rotation of the reel is locked in the recording tape cartridge relating to the embodiment of the present invention.
Figure 5:
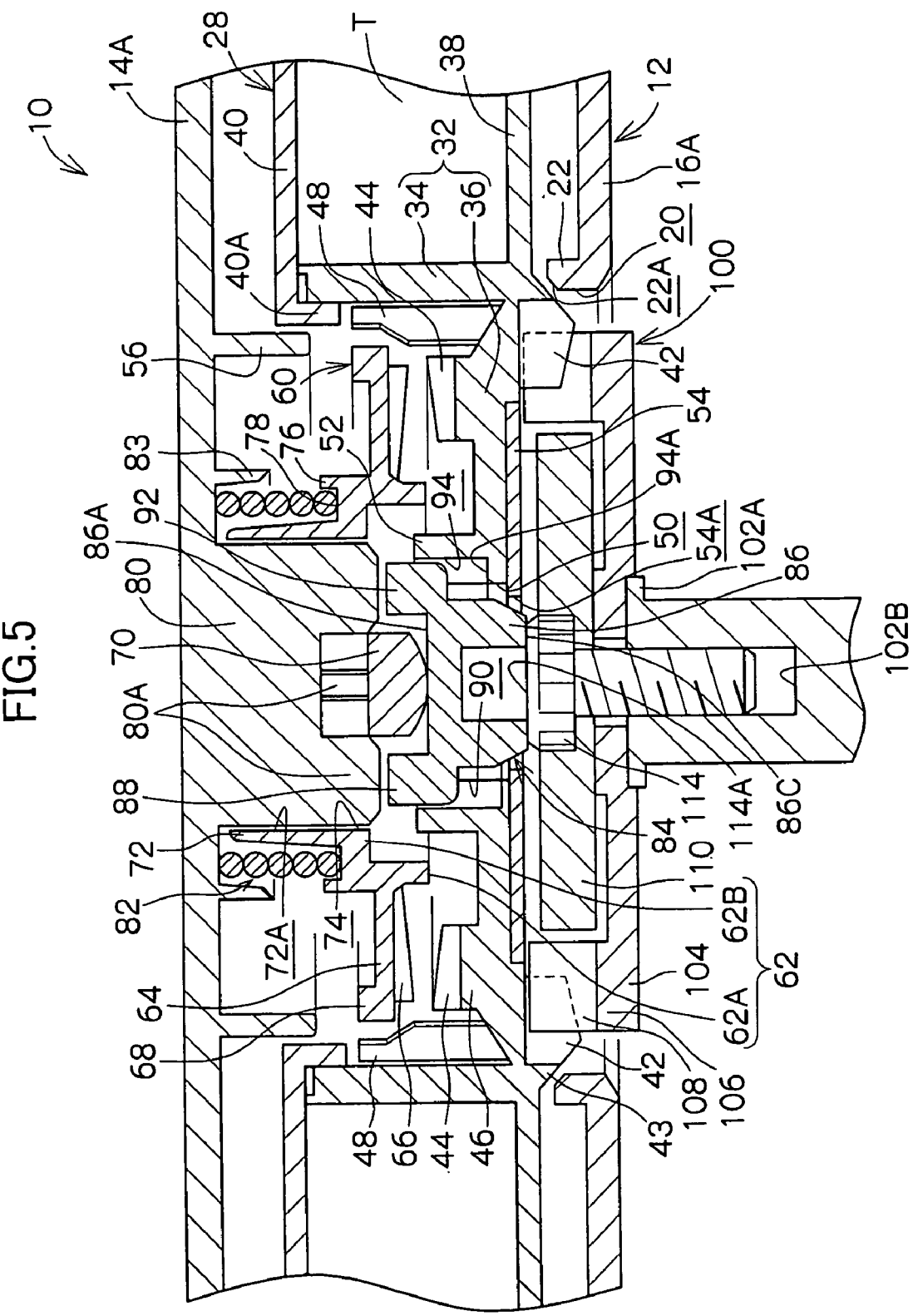
FIG. 5 is an enlarged sectional view of main portions at the time when locking of rotation of the reel is released in the recording tape cartridge relating to the embodiment of the present invention.
Figure 6:
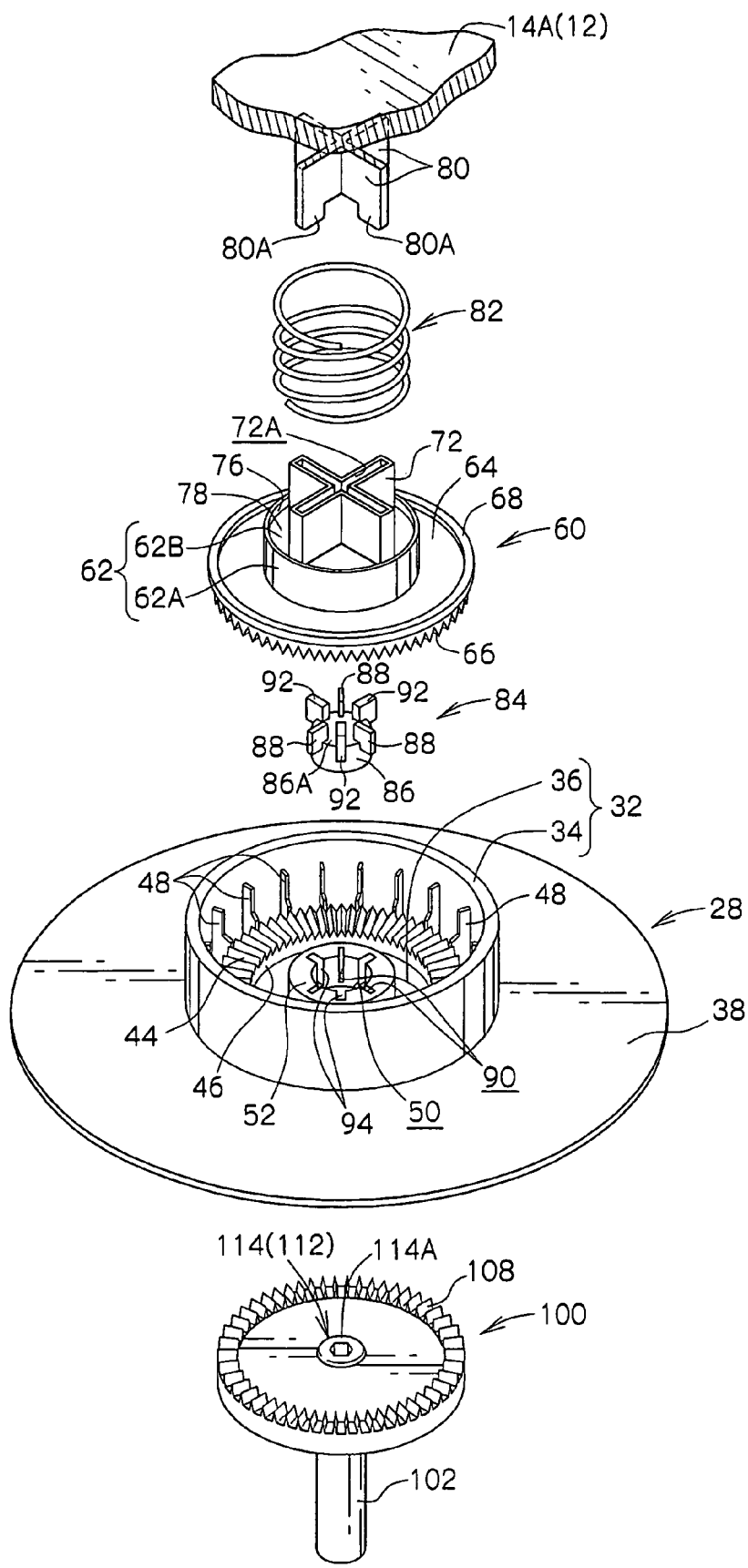
FIG. 6 is an exploded perspective view, as seen from above, illustrating a rotating shaft of a drive device and a braking means structuring the recording tape cartridge relating to the embodiment of the present invention.

As shown in FIGS. 3 through 5, the reel 28 has a reel hub 32 which structures the axially central portion of the reel 28. The reel hub 32 is formed substantially in the shape of a hollow cylinder having a bottom, and has a cylindrical portion 34 around whose outer peripheral surface the magnetic tape T is wound, and a bottom portion 36 which closes the bottom portion of the cylindrical portion 34. As shown in FIG. 6, a lower flange 38 extends coaxially and integrally at the radial direction outer side of a vicinity of the bottom portion 36 side end portion (i.e., the bottom end portion) of the reel hub 32.

On the other hand, an upper flange 40 is joined to the top end portion of the reel hub 32. (The upper flange 40 is omitted from illustration in FIGS. 6 through 8.) The outer diameter of the upper flange 40 is the same as the outer diameter of the lower flange 38. A short tubular portion 40A, whose outer diameter corresponds to the inner diameter of the cylindrical portion 34, is provided at the axially central portion of the upper flange 40. The upper flange 40 is coaxially fixed to the reel hub 32 by ultrasonic welding in a state in which the short tubular portion 40A is fit into the cylindrical portion 34 in a vicinity of the top end thereof.

In this way, at the reel 28, the magnetic tape T is wound on the outer peripheral surface of the cylindrical portion 34 of the reel hub 32 between the opposing surfaces of the lower flange 38 and the upper flange 40. The cylindrical portion 34 is open upwardly.

Figure 7:
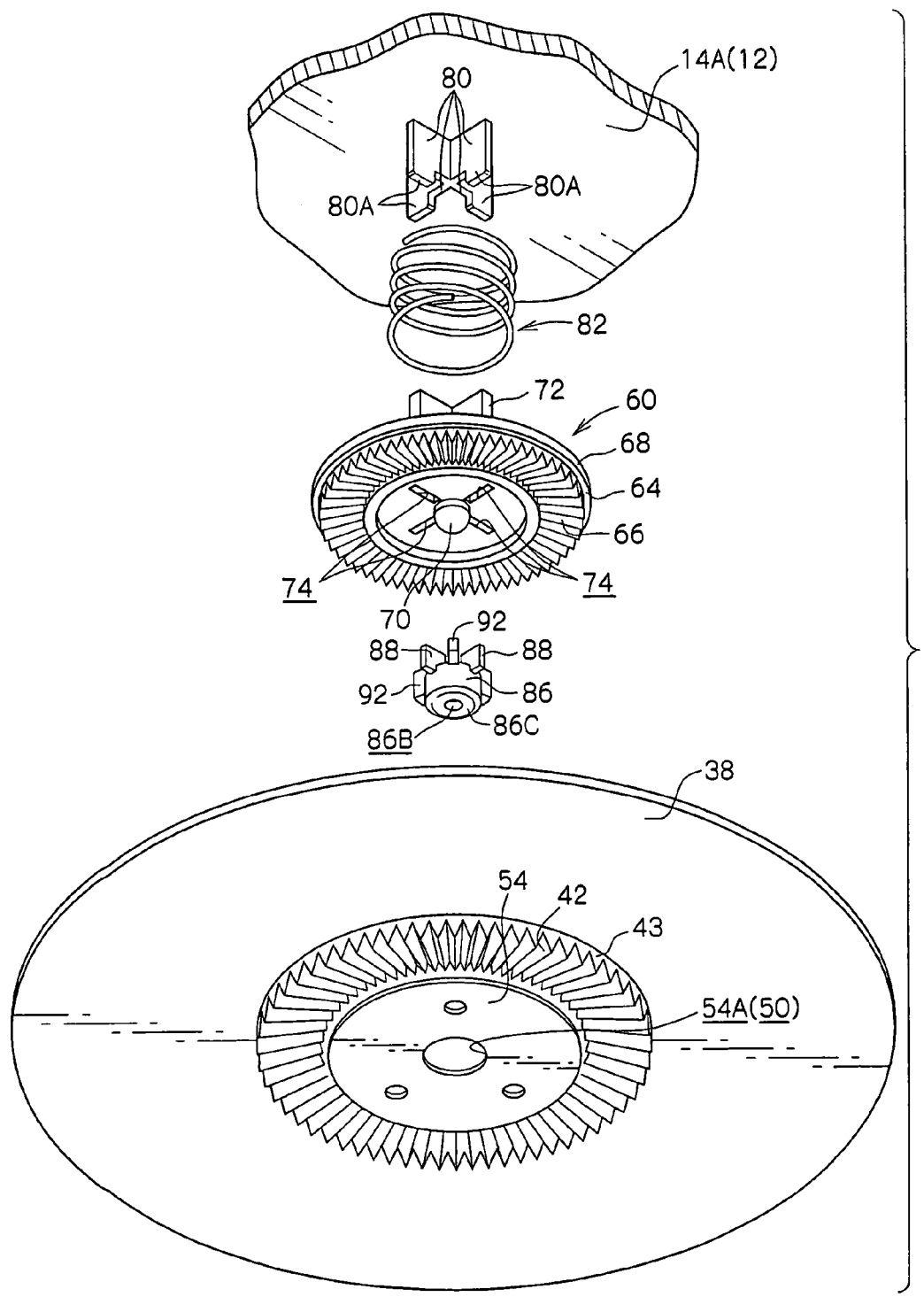
FIG. 7 is an exploded perspective view, as seen from below, illustrating the braking means structuring the recording tape cartridge relating to the embodiment of the present invention.
Figure 8:
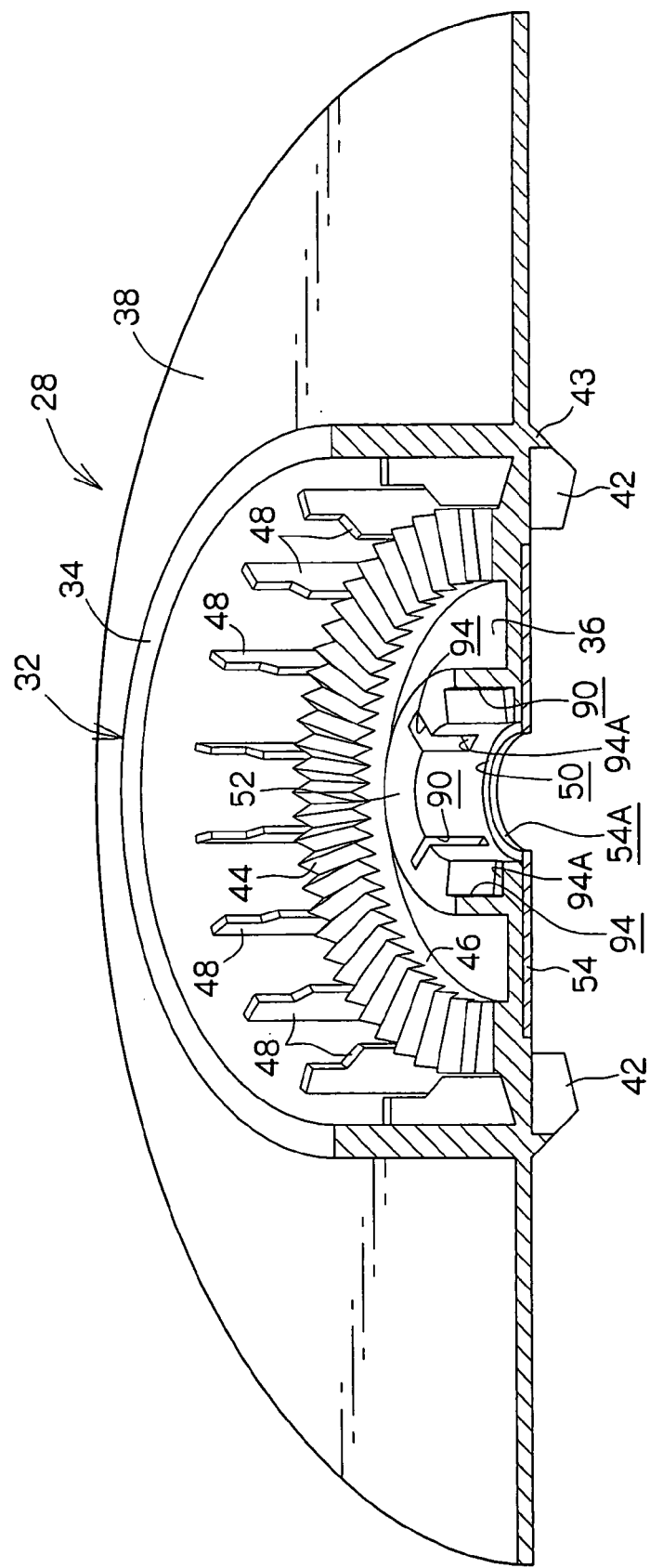
FIG. 8 is a cut diagram of the reel structuring the recording tape cartridge relating to the embodiment of the present invention.

As shown in FIGS. 7 and 8 as well, the reel gear 42, which is formed overall in an annular shape which is coaxial with the reel 28, is provided in a vicinity of the outer periphery of the bottom surface (outer surface) of the bottom portion 36 of the reel hub 32. The reel gear 42 can mesh with a driving gear 108 which is provided at the distal end of a rotating shaft 100 (to be described later) of a drive device. The addenda of the reel gear 42 project further downward than the bottom surface of the lower flange 38. The teeth bottoms of the reel gear 42 are positioned above the bottom surface of the lower flange 38. The radial direction outer side end portions of the respective teeth are connected by a taper portion 43 which is continuous with the lower flange 38 from the central portions in the heightwise direction of the teeth to the teeth bottoms.

On the other hand, as shown in FIGS. 6 and 8, an engaging gear 44, which serves as an engaging portion and which is formed overall in an annular shape which is coaxial with the reel 28, is provided at the vicinity of the outer periphery of the top surface (the inner surface) of the bottom portion 36 of the reel hub 32. The engaging gear 44 is formed on an annular pedestal portion 46 which protrudes slightly from the inner surface of the bottom portion 36, and can mesh with a braking gear 66 of a braking member 60 which will be described later.

A plurality of standing ribs 48, which are continuous with the inner surface of the cylindrical portion 34 and the top surface of the bottom portion 36, are provided at uniform intervals in the peripheral direction along the axial direction of the reel 28 at the radial direction outer side of the engaging gear 44 (the pedestal portion 46). Due to the existence of these standing ribs 48, the engaging gear 44 is positioned further toward the radial direction inner side than the reel gear 42. (The engaging gear 44 is provided along a circumference having a smaller diameter than that of the reel gear 42, and in the present embodiment, overlaps with a portion of the reel gear 42.) Note that the function of the standing ribs 48 will be described later together with the braking member 60.

A pass-through hole 50, which passes through the bottom portion 36, is provided at the axially central portion of the bottom portion 36 of the reel hub 32. A boss portion 52 for a clutch, which is shaped as a short cylindrical tube, stands erect along the edge of the pass-through hole 50 from the top surface of the bottom portion 36. The boss portion 52 for a clutch will be described later together with a clutch member 84.

The portions of the above-described reel 28, other than the upper flange 40, are formed integrally by resin molding. Moreover, a reel plate 54, which is an annular plate formed of a magnetic material, is provided coaxially and integrally by insert molding at the inner side of the reel gear 42 at the bottom surface of the bottom portion 36 of the reel hub 32. A through hole 54A is formed in the axially central portion of the reel plate 54. The inner diameter of the through hole 54A is formed so as to be slightly smaller than the inner diameter of the pass-through hole 50.

The reel 28 is accommodated within the case 12, and is set on the annular rib 22 when the recording tape cartridge 10 is not in use. Specifically, as shown in FIG. 4, the portion of the bottom portion 36 at the outer side of the taper portion 43 (i.e., a vicinity of the inner edge of the lower flange 38) abuts the top end surface of the annular rib 22, and radial direction movement of the reel 28 is restricted due to the inner edge portion of the top end of the annular rib 22 being a taper surface 22A corresponding to the taper portion 43.

In this state, the reel 28 is positioned on the whole within the case 12, and the reel gear 42 and the reel plate 54 are exposed from the gear opening 20 (see FIG. 1B). Namely, the reel gear 42 faces the exterior of the case 12 from the gear opening 20, without projecting out from the outer surface (the bottom surface) of the floor plate 16A. Further, the pass-through hole 50 faces the gear opening 20 through the through hole 54A of the reel plate 54.

In this way, the reel 28 can be operated, i.e., grasped (held) and driven to rotate, from the exterior of the case 12. Further, in this state, an annular restricting rib 56, which stands erect from the ceiling plate 14A, is disposed in the top portion of the cylindrical portion 34 of the reel 28. The outer peripheral surface of the restricting rib 56 is adjacent to the inner peripheral surface of the short tubular portion 40A of the upper flange 40, such that joggling of the reel 28 within the case 12 is prevented.

The recording tape cartridge 10 has a braking means for impeding rotation of the reel 28 when the recording tape cartridge 10 is not in use. This braking means has the braking member 60 which serves as a "braking member". As shown in FIGS. 4 and 5, the braking member 60 has a main body portion 62. The main body portion 62 is substantially formed as a hollow cylinder which has a bottom and which opens downward, by a tubular portion 62A formed in the shape of a short tube, and a disc portion 62B which closes the top end of the tubular portion 62A. The outer diameter of the tubular portion 62A is smaller than the inner diameter of the engaging gear 44 (the pedestal portion 46). The inner diameter of the tubular portion 62A is larger than the outer diameter of the boss portion 52 for a clutch. Due to the existence of this main body portion 62 which is formed as a hollow cylinder having a bottom, the rigidity of the braking member 60 is high has compared with a case in which the braking member is formed in the shape of a disc as in the conventional art.

A ring portion 64 formed in an annular form extends outwardly in the radial direction along the entire periphery, from an axial direction intermediate portion at the outer peripheral portion of the main body portion 62 (the tubular portion 62A). The braking gear 66 is provided along the entire periphery at the bottom surface of the ring portion 64. Namely, the braking gear 66 is formed in an annular form overall. The braking gear 66 is structured so as to be able to mesh with the engaging gear 44 of the reel 28. Further, the inner end portions of the respective teeth forming the braking gear 66 are connected by the tubular portion 62A. The outer end portions of the teeth, which are in a free state, are positioned slightly further inward, in the radial direction, than the outer edge of the ring portion 64. In other words, the ring portion 64 juts out further outwardly in the radial direction than the braking gear 66. More specifically, the outer diameter of the ring portion 64 is slightly larger than the outer diameter of the engaging gear 44, and the outer diameter of the braking gear 66 is slightly smaller than the outer diameter of the engaging gear 44. Moreover, an annular reinforcing rib 68 stands erect at the top surface of the ring portion 64 along the outer edge portion thereof, such that the rigidity of the ring portion 64 (the braking gear 66) is ensured.

A slide-contact projection 70 projects from the axially central portion of the bottom surface of the disc portion 62B of the main body portion 62 (i.e., the tubular portion 62A inner side). The distal end portion of the slide-contact projection 70 is substantially formed in the shape of a spherical surface, and substantially point-contacts the clutch member 84 which will be described later. The distal end of the slide-contact projection 70 is positioned slightly higher than the bottom end surface of the tubular portion 62A (i.e., at the inner side of the tubular portion 62A).

On the other hand, a cross-shaped projection 72 stands erect at the top surface of the disc portion 62B. An insertion groove 72A, which is substantially cross-shaped in plan view, is formed in the cross-shaped projection 72. Through holes 74, which pass through the disc portion 62B in the direction of plate thickness thereof, are formed in the disc portion 62B. Four of the through holes 74 are formed so as to communicate with the radial direction outer side portions of the insertion groove 72A (which is formed in a cross-shape in plan view), except for the axially central portion (which is the intersection portion) of the insertion groove 72A (see FIG. 7). The through holes 74 are respectively formed in rectangular shapes. In this way, the respective through holes 74 are positioned adjacent to the radial direction outer side of the slide-contact projection 70, and open to the interior of the tubular portion 62A.

Further, an annular rib 76 stands erect at the outer peripheral portion of the top end of the main body portion 62. The top surface of the disc portion 62B between the rib 76 and the cross-shaped projection 72 is a spring receiving surface 78 which one end portion of a compression coil spring 82 (which will be described later) abuts.

The braking member 60, which has been described above, is inserted substantially coaxially in the cylindrical portion 34 of the reel hub 32 so as to be movable in the vertical direction (the axial direction of the reel 28). Namely, due to the braking member 60 moving in the vertical direction, the braking member 60 can be set at a position at which the braking gear 66 meshes with the engaging gear 44 of the reel hub 32 (a rotation locked position), and a position at which this meshing is released (a rotation permitted position). Note that the length of the tubular portion 62A is determined such that, when the braking member 60 is positioned at the rotation locked position, the bottom end surface of the braking member 60 does not abut the bottom portion 36 (see FIG. 4).

A cross-shaped rib 80 (see FIGS. 6 and 7), which projects downward from the ceiling plate 14A of the case 12, is disposed in the insertion groove 72A of the cross-shaped projection 72 of the braking member 60. The cross-shaped rib 80 is formed in the shape of a detent which is formed as if two thin plates intersect one another orthogonally. Due to the cross-shaped rib 80 engaging with the cross-shaped projection 72 (the groove walls of the insertion groove 72A), rotation of the braking member 60 with respect to the case 12 is impeded.

In this way, the braking member 60 impedes rotation of the reel 28 in a state in which the braking gear 66 meshes with the engaging gear 44 of the reel hub 32. Note that the state in which the cross-shaped rib 80 is inserted in the insertion groove 72A is maintained over the entire stroke of movement of the braking member 60 in the vertical direction, such that the cross-shaped rib 80 also functions to guide the direction of movement of the braking member 60 in the vertical direction. Moreover, the cross-shaped rib 80 has projecting pieces 80A which extend from the bottom end portion of the cross-shaped rib 80 at positions corresponding to the respective through holes 74 of the braking member 60. The widths of the respective projecting pieces 80A (i.e., the lengths of the projecting pieces 80A in the radial direction of the braking member 60) are narrow in accordance with the lengthwise dimensions of the respective through holes 74, and the projecting pieces 80A enter into respectively different ones of the through holes 74.

When the braking member 60 is positioned at the rotation locked position, the respective projecting pieces 80A are positioned within the insertion groove 72A. When the braking member 60 is at the released position, the projecting pieces 80A enter into the respective through holes 74 and project from the bottom surface of the disc portion 62B (i.e., pass through the through holes 74). In this way, due to the projecting pieces 80A being formed so as to extend, the cross-shaped rib 80 not only impedes rotation of the braking member 60 with respect to the case 12, but also, the amount thereof which is engaged with the braking member 60 (the depth of insertion thereof into the braking member 60) is greatly increased, and the cross-shaped rib 80 suppresses tilting of the braking member 60 with respect to the case 12. Further, the cross-shaped rib 80 which has this structure has an improved ability to guide the braking member 60 in the vertical direction. Note that, in the present embodiment, the engaged amount, in the axial direction, of the cross-shaped rib 80 (including the projecting pieces 80A) with the braking member 60 which is positioned at the rotation locked position, is set to be sufficiently larger than the entire stroke of movement of the braking member 60 (see FIG. 4).

When the braking member 60 is positioned at the rotation locked position, radial direction movement of the reel 28 is restricted by the standing ribs 48. When the braking member 60 is positioned at the rotation permitted position, there is no fear of interference between the braking member 60 and the standing ribs 48 which rotate together with the reel 28. Therefore, the standing ribs 48 are positioned adjacent to the reinforcing rib 68 of the ring portion 64 of the braking member 60 which is positioned at the rotation locked position (see FIG. 4), and the top portions of the standing ribs 48 are cut such that the gap between the standing ribs 48 and the reinforcing rib 68 of the braking member 60 positioned at the rotation permitted position is greater than or equal to a predetermined value (see FIG. 5). In this way, not only is movement of the reel 28 directly restricted by the case 12 (the annular rib 22 having the taper surface 22A, and the restricting rib 56), but also, in a vicinity of the position of the center of gravity thereof, radial direction movement of the reel 28 with respect to the case 12 is restricted via the braking member 60. The recording tape cartridge 10 can also stably be loaded in standing-type drive devices (in which the axis of the reel 28 is the horizontal direction).

The compression coil spring 82, which can be interpreted in the broad sense as an urging means, is disposed between the ceiling plate 14A and the spring receiving surface 78 of the braking member 60. One end portion of the compression coil spring 82 abuts the spring receiving surface 78, whereas the other end portion thereof abuts the ceiling plate 14A. This other end portion is positioned at the inner side of an annular wall portion 83 which projects from the ceiling plate 14A at the outer side of the cross-shaped rib 80, such that the position of the compression coil spring 82 does not become offset in the radial direction.

Due to the urging force of the compression coil spring 82, the braking member 60 is urged downward, and usually, the braking gear 66 meshes with the engaging gear 44 such that inadvertent rotation of the reel 28 is reliably prevented (i.e., the braking member 60 is positioned at the rotation locked position). Further, due to this urging force, the reel 28, which meshes with the braking member 60 at the engaging gear 44, also is urged downward and abuts the annular rib 22 such that the reel 28 does not joggle within the case 12.

As shown in FIGS. 4 through 7, the recording tape cartridge 10 is provided with the clutch member 84 which serves as a "releasing member" and which is operated from the exterior at the time of releasing the state in which the reel 28 is locked by the braking member 60. The clutch member 84 is disposed between the bottom portion 36 of the reel 28 and the braking member 60. The clutch member 84 will be described concretely hereinafter.

The clutch member 84 has a clutch main body 86 which is formed as a substantially solid cylinder and serves as a "base portion". The outer diameter of the clutch main body 86 is formed so as to be slightly smaller than the through hole 54A of the reel plate 54, i.e., the inner diameter of the pass-through hole 50 which coincides with the inner diameter of the boss portion 52 for a clutch, such that the clutch main body 86 can pass through the pass-through hole 50. The flat top end surface of the axially central portion of the clutch main body 86 is a slide-contact surface 86A which always abuts the slide-contact projection 70 of the braking member 60. The flat bottom end surface of the clutch main body 86, which is around a thinning hole 86B which opens downward, is a press operation surface 86C. As will be described in detail later, when the press operation surface 86C of the clutch member 84 is pressed, the clutch member 84 moves upward against the urging force of the compression coil spring 82, and moves the braking member 60 to the rotation permitted position.

The clutch member 84 has rotation restricting ribs 88 which serve as "guide members" or "engaging pieces" and which protrude (jut out) further toward the outer side in the radial direction than the outer peripheral surface of the clutch main body 86. A plurality of the rotation restricting ribs 88 (three in the present embodiment) are provided at uniform intervals in the peripheral direction of the clutch main body 86. The rotation restricting ribs 88 are disposed in a radial manner as seen in plan view. The respective rotation restricting ribs 88 project further upward than the slide-contact surface 86A, so as to extend between (connect) the top end surface of the clutch main body 86 which is around the slide-contact surface 86A and the outer peripheral surface of the clutch main body 86 in a vicinity of the top end surface thereof.

The rotation restricting ribs 88 are disposed within rotation restricting grooves 90 which serve as "guide portions" or "guide grooves" and which are formed in a recessed manner from the inner edge portion of the boss portion 52 for a clutch. Namely, three of the rotation restricting grooves 90 are provided at uniform intervals in the peripheral direction of the boss portion 52 for a clutch. The rotation restricting grooves 90 open upwardly at the top end of the boss portion 52 for a clutch. In this way, the clutch member 84 can move in the vertical direction while being guided, at the rotation restricting ribs 88, by the rotation restricting grooves 90 of the boss portion 52 for a clutch.

The state in which the rotation restricting ribs 88 are disposed in the rotation restricting grooves 90 of the boss portion 52 for a clutch is maintained also when the clutch member 84 moves upward and the braking member 60 is positioned at the rotation permitted position. In this way, the clutch portion 84 cannot rotate relative to the reel 28, i.e., always rotates integrally with the reel 28.

In addition, because the rotation restricting grooves 90 are closed at the bottom end portion of the boss portion 52 for a clutch, falling-out of the clutch member 84 from the reel hub 32 can be impeded by the rotation restricting ribs 88 and the rotation restricting grooves 90. However, in the present embodiment, separately from the rotation restricting ribs 88, the clutch member 84 also has seat ribs 92 which serve as "stopper portions" and which are for impeding falling-out of the clutch member 84 from the reel hub 32 and for causing the slide-contact surface 86A to abut the braking member 60 which is positioned at the rotation locked position.

A plurality of the seat ribs 92 are provided at uniform intervals in the peripheral direction of the clutch main body 86. In the present embodiment, a total of three of the seat ribs 92 are provided at intermediate portions, in the peripheral direction, between the respective rotation restricting ribs 88. In the same way as the rotation restricting ribs 88, the seat ribs 92 project upward and outward in the radial direction so as to extend between the top end surface of the clutch main body 86 around the slide-contact surface 86A and the outer peripheral surface of the clutch main body 86 in a vicinity of the top end surface thereof, and are disposed in a radial manner as seen in plan view.

The respective seat ribs 92 are disposed (enter) in stopper grooves 94 which are recessed in from the inner edge portion of the boss portion 52 for a clutch. Namely, the stopper grooves 94 are provided at uniform intervals in the peripheral direction of the boss portion 52 for a clutch, at the respective intermediate portions in the peripheral direction between the respective rotation restricting grooves 90. The stopper grooves 94 are open upwardly at the top end of the boss portion 52 for a clutch. The top surfaces of the bottom portions which close the bottom end portions of the stopper grooves 94 are stopper surfaces 94A. When the braking member 60, which always abuts the slide-contact surface 86A at the slide-contact projection 70, is at the rotation locked position, the bottom end surfaces of the seat ribs 92 abut (sit on) the stopper surfaces 94A. Positioning of the clutch member 84 when the reel 28 is in the rotation locked state is thereby carried out.

In this way, by providing the rotation restricting ribs 88 and the seat ribs 92 independently of one another, the clutch member 84 is structured such that the functions thereof are divided into, on the one hand, the guiding function and the rotation restricting function, and, on the other hand, the axial direction movement restricting function. The clutch main body 86, the rotation restricting ribs 88, and the seat ribs 92 of the clutch member 84 are formed integrally by resin molding.

Figure 9A:
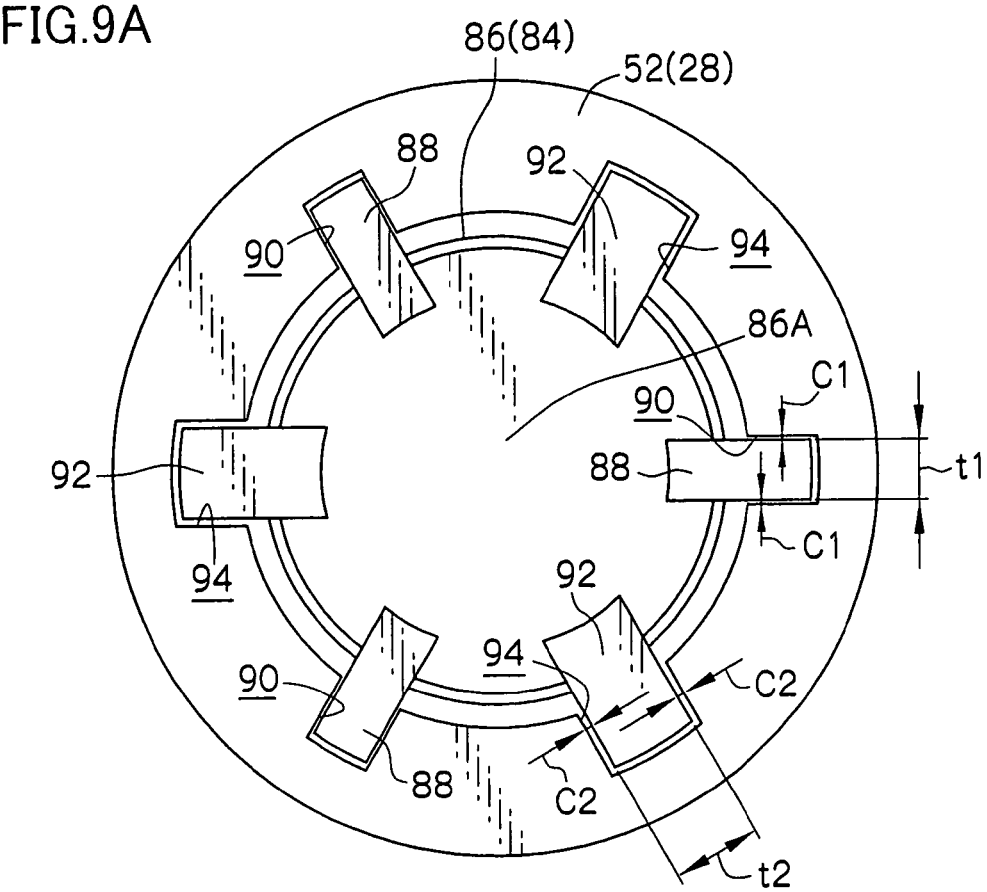
FIGS. 9A and 9B are diagrams showing in detail a state in which a clutch member, which structures the recording tape cartridge relating to the embodiment of the present invention, is assembled to the reel, where
Figure 9B:
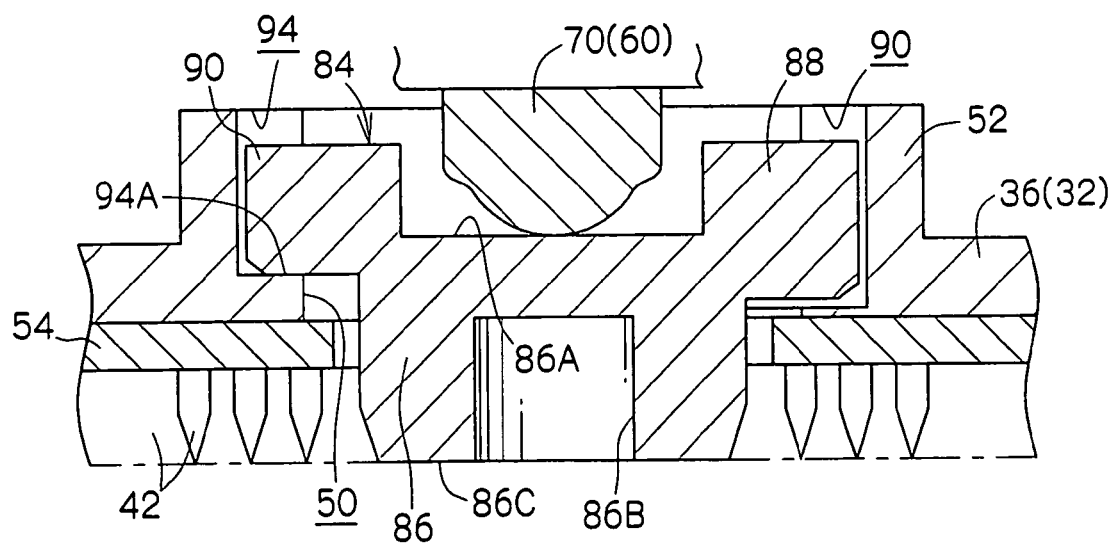

As shown in FIG. 9B, the heights of the top end surfaces of the respective rotation restricting ribs 88 and the respective seat ribs 92 coincide. However, the bottom end surfaces of the rotation restricting ribs 88 are positioned lower than the bottom end surfaces of the seat ribs 92. In correspondence therewith, the top ends of the stopper grooves 94 and the rotation restricting grooves 90, which both are open at the top end of the boss portion 52 for a clutch, coincide, but the floor (bottom) surfaces of the rotation restricting grooves 90 are positioned lower than the stopper surfaces 94A of the stopper grooves 94. In other words, the rotation restricting ribs 88 are longer, in the vertical direction, than the seat ribs 92, and the rotation restricting grooves 90 are deeper, in the vertical direction, than the stopper grooves 94.

The reasons for this are as follows. By making the amount by which the rotation restricting ribs 88 and the boss portion 52 for a clutch can be engaged (i.e., the amount by which the rotation restricting ribs 88 can be inserted into the rotation restricting grooves 90) large, the stress received from the reel 28 when the reel 28 rotates can be mitigated. At the same time, the ability to guide the clutch member 84 when the clutch member 84 is moving up and down improves, and joggling of the clutch member 84 also when the braking member 60 is positioned at the rotation permitted position is suppressed.

In order to further suppress such joggling, as shown in FIG. 9A, a clearance C1 at one peripheral direction side between the rotation restricting rib 88 and the rotation restricting groove 90 is small to the extent that the sliding resistance at the time when the clutch member 84 moves up and down is not excessive. Moreover, the thickness of the rotation restricting rib 88 (i.e., the plate thickness thereof in the peripheral direction of the clutch member 84) is made to be thin within a range which does not present problems with respect to strength. The dimensional accuracy, resulting from the resin molding, of the rotation restricting rib 88 is high. Therefore, the clearance C1 can be made to be even smaller. In the present embodiment, a thickness t1 of the rotation restricting rib 88 is 1.5 mm, and the clearance C1 is 0.05 mm.

On the other hand, the thickness of the seat rib 92 is larger than the thickness of the rotation restricting rib 88. In this way, when the seat ribs 92 abut the stopper surfaces 94A, sufficient rigidity can be ensured with respect to the urging force of the compression coil spring 82 which is applied via the braking member 60. The thickness (dimension) of the regions of the bottom portion 36 at which are formed the stopper surfaces 94A which the seat ribs 92 abut is large due to the stopper grooves 94 being made to be shallow, and sufficient rigidity with respect to the urging force of the compression coil spring 82 is ensured here as well.

By making the seat ribs 92 thick, the resin flowability at the time of molding is relatively poor. However, due to the seat ribs 92 being shorter than the rotation restricting ribs 88 as described above, it is difficult for the effect of the flowability being poor to be felt (i.e., it is difficult for the flowability to affect other portions). In addition, the seat ribs 92, which are formed to be thick and whose dimensional accuracy is inferior to that of the rotation restricting ribs 88, are formed such that there is no need for them to function to guide the clutch member 84 and to function to suppress joggling of the clutch member 84. A clearance C2, in the peripheral direction and between the seat rib 92 and the stopper groove 94, is formed to be sufficiently greater than the clearance C1. In this way, sliding resistance between the seat ribs 92 and the boss portion 52 for a clutch when the clutch member 84 moves up and down either is not generated, or is markedly suppressed. In the present embodiment, a thickness t2 of the seat rib 92 is 2 mm, and the clearance C2 is 0.1 mm.

The heights (i.e., the positions of the top ends) of the rotation restricting ribs 88 and the seat ribs 92 are determined (see FIG. 5) such that the rotation restricting ribs 88 and the seat ribs 92 do not interfere with the projecting pieces 80A of the case 12 which pass through the disc portion 62B of the braking member 60, at the time when the clutch member 84 moves upward and the braking member 60 is positioned at the rotation permitted position.

At the above-described clutch member 84, in the state in which the rotation restricting ribs 88 are inserted in respectively different rotation restricting grooves 90 and the seat ribs 92 are inserted in respectively different stopper grooves 94, the clutch main body 86 is inserted through the pass-through hole 50 and the through hole 54A. Further, usually, the respective seat ribs 92 are maintained in a state of abutting the stopper surfaces 94A, by the urging force of the compression coil spring 82 which is applied via the braking member 60. In this state, the bottom end surfaces of the rotation restricting ribs 88 are separated slightly from the floor surfaces of the rotation restricting grooves 90 (see FIG. 9B), and the vertical direction position of the press operation surface 86C is positioned slightly (in the present embodiment, 0.1 mm) above the addenda of the reel gear 42. In this state, the upper portion of the clutch member 84 and the boss portion 52 for a clutch are disposed in (entered within) the tubular portion 62A of the braking member 60. The tubular portion 62A, together with the boss portion 52 for a clutch, forms a labyrinthine structure, such that entry of dust through the pass-through hole 50 and into the case 12 (the reel hub 32) is suppressed. Moreover, (from the standpoint of the function thereof, there is no need for the seat ribs 92 to be disposed in the stopper grooves 94, however,) the entry of dust into the reel hub 32 is impeded by the seat ribs 92 being disposed in the stopper grooves 94.

As the reel gear 42 meshes with the driving gear 108 of the drive device, the clutch member 84 is pressed by a release surface 114A of the drive device and moves upward. Before description of this function is given, the rotating shaft 100 of the drive device will be described.

Figure 10:
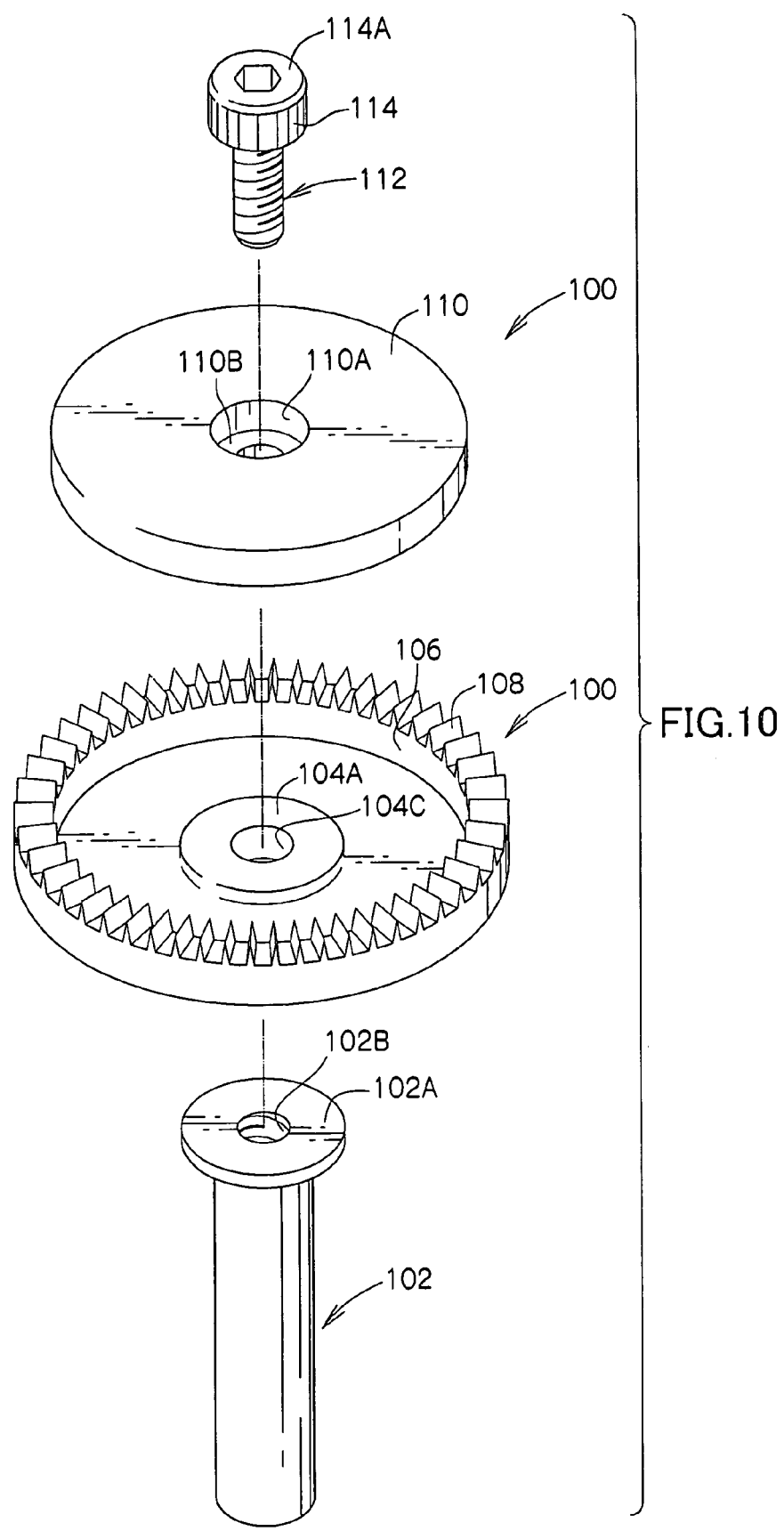
FIG. 10 is an exploded perspective view of the rotating shaft of the drive device in which the recording tape cartridge relating to the embodiment of the present invention is loaded.
Figure 11:
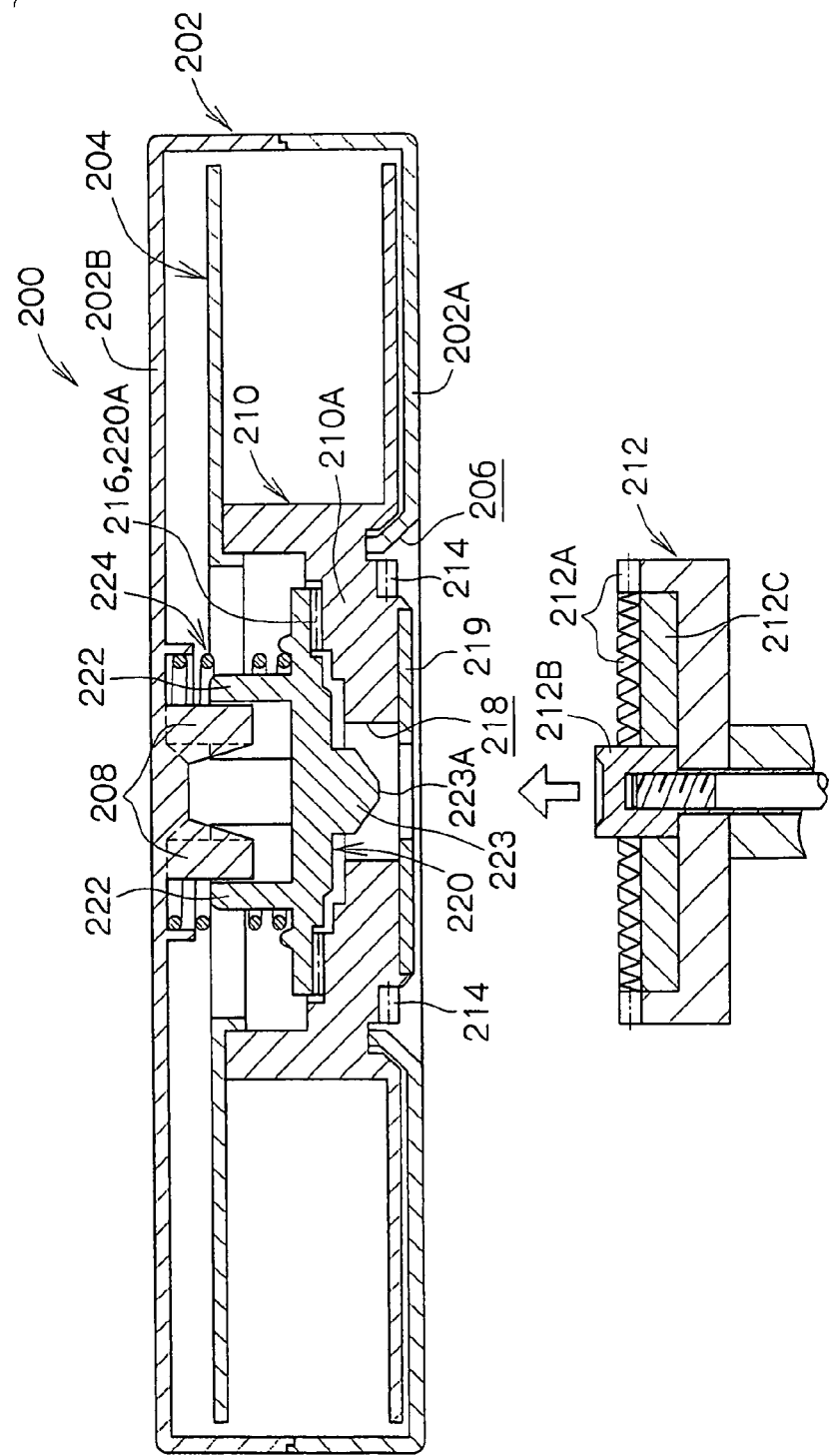
FIG. 11 is a sectional view showing a conventional recording tape cartridge.
Figure 12:
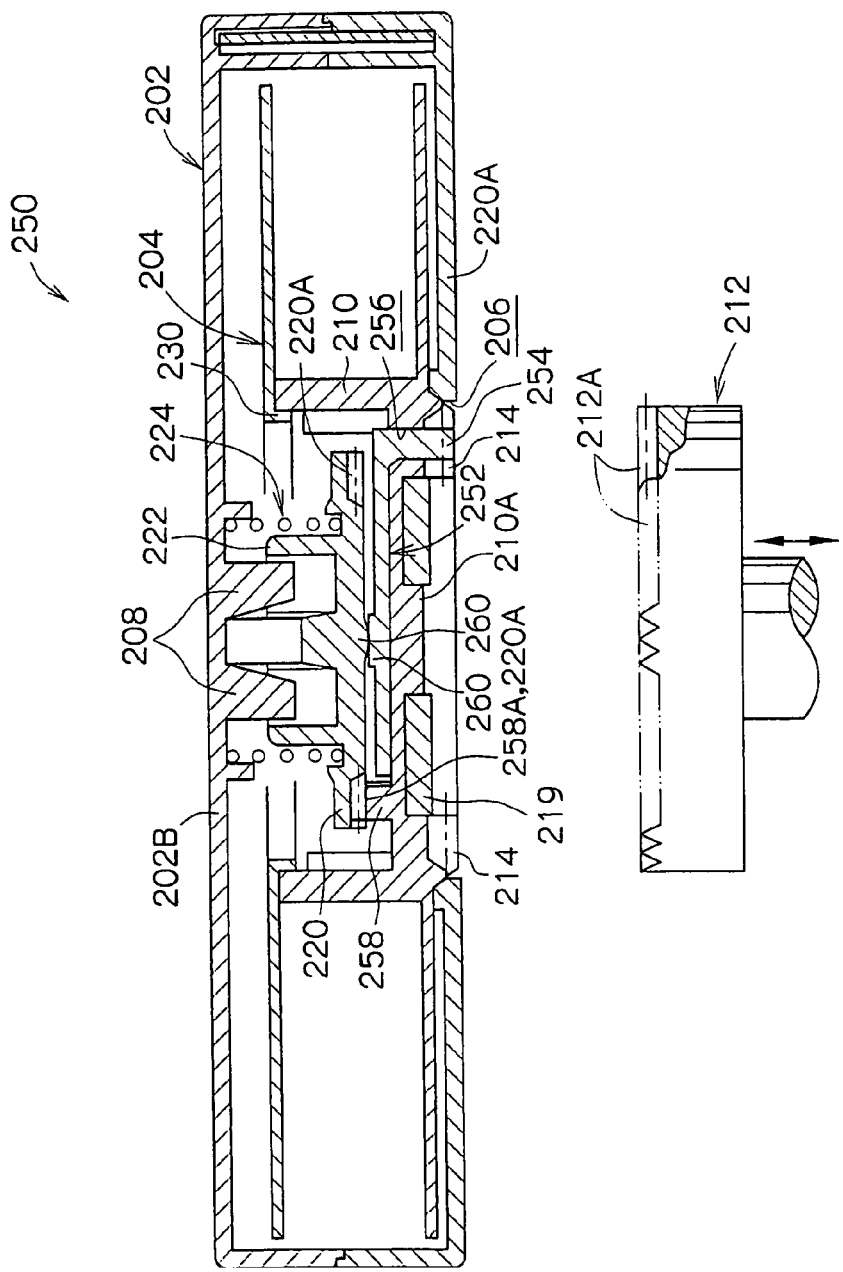
FIG. 12 is a sectional view showing a second conventional recording tape cartridge.
Figure 13:
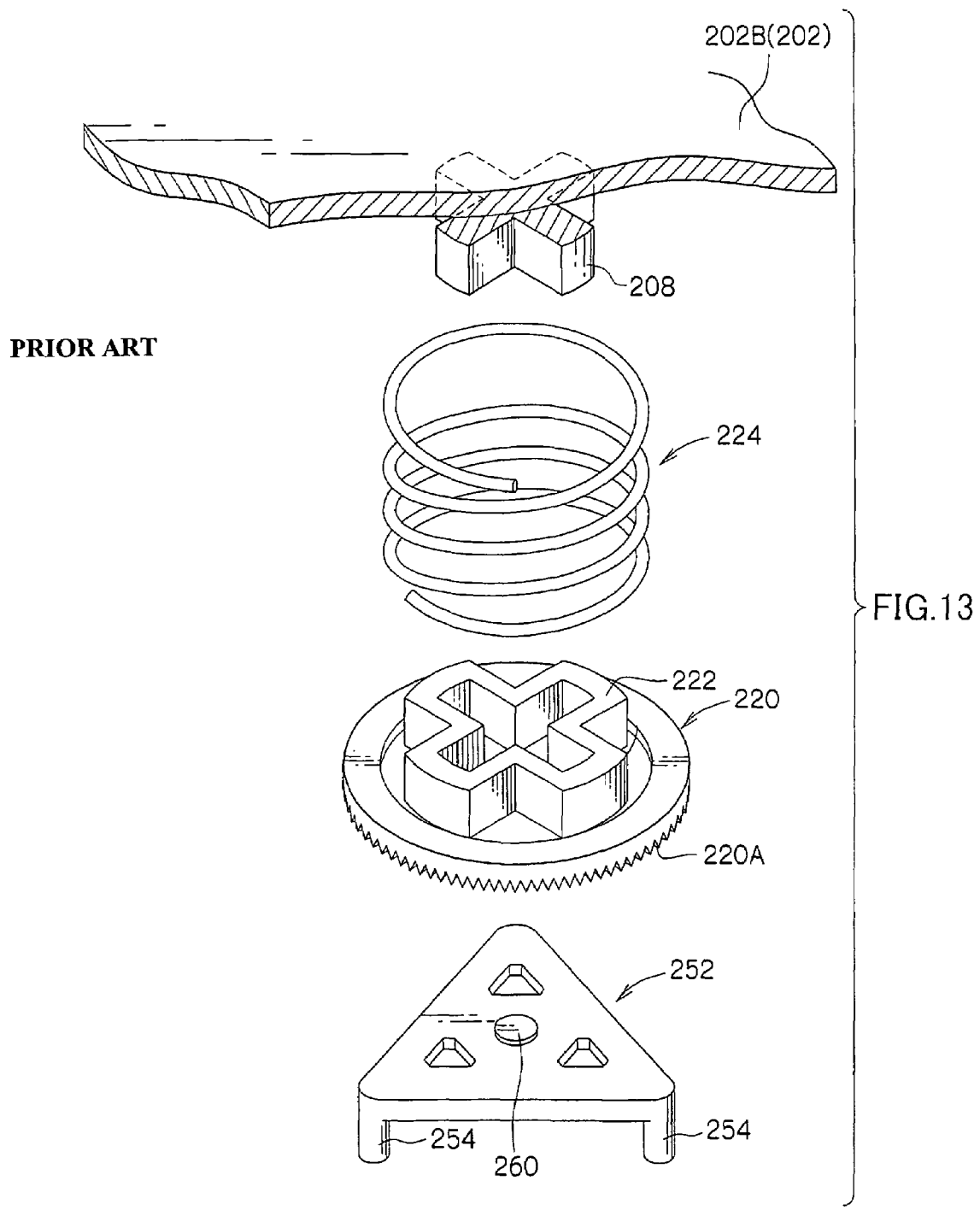
FIG. 13 is an exploded perspective view showing a braking means structuring the second conventional recording tape cartridge.

As shown in an exploded perspective view in FIG. 10, the rotating shaft 100 has a rotating shaft portion 102. A flange portion 102A, which extends outwardly in the radial direction of the rotating shaft portion 102, is formed integrally at the top end of the rotating shaft portion 102. A screw hole 102B, which opens upwardly, is formed in the axially central portion of the rotating shaft portion 102. A disc-shaped rotating table 104 is fixed to the top end of the rotating shaft portion 102.

An annular convex portion 106 projects from the top surface of the rotating table 104 along the outer peripheral portion thereof. The driving gear 108, which can mesh with the reel gear 42 of the recording tape cartridge 10, is formed at the top surface of the annular convex portion 106. Further, as shown in sectional view in FIG. 4 and the like, the top surface side of the axially central portion of the rotating table 104 is a magnet receiving portion 104A which protrudes slightly, and the bottom surface side is a fit-together concave portion 104B which is recessed in correspondence with the flange portion 102A. A through hole 104C passes through the axially central portion of the rotating table 104.

A magnet 110, which is substantially formed in the shape of a disc, is disposed coaxially at the radial direction inner side of the annular convex portion 106 (the driving gear 108) at the rotating table 104. A pass-through hole 110A is formed in the axially central portion of the magnet 110. A step portion 110B which faces upward is formed substantially at the axial direction central portion of the pass-through hole 110A. The region of the pass-through hole 110A which is above the step portion 110B has a large diameter, whereas the region of the pass-through hole 110A which is below the step portion 110B has a small diameter.

The rotating shaft 100 is structured as follows: in the state in which the flange portion 102A of the rotating shaft portion 102 is fit-together with the fit-together concave portion 104B of the rotating table 104 and the magnet 110 is placed on the magnet receiving portion 104A, by screwing a pressing bolt 112 into the screw hole 102B, a head portion 114 of the pressing bolt 112 engages with the step portion 110B. Namely, the rotating table 104 and the magnet 110 are fixed to the rotating shaft portion 102 while nipped between the rotating shaft portion 102 and the head portion 114. The rotating shaft 100 is thereby structured so as to rotate integrally on the whole.

The pressing bolt 112 is formed of metal and is a bolt having a hexagonal hole, and structures the "releasing portion" in the present invention. The flat, top end surface (around the hexagonal hole) of the head portion 114 is a release surface 114A which abuts the press operation surface 86C of the clutch member 84. The release surface 114A is finished to a degree of flatness which is equivalent to or greater than that of the top surface of the magnet 110. In this way, the posture of the clutch member 84 which is abutting the release surface 114A is stable, and it is possible to prevent the clutch member 84 from tilting with respect to the axial direction of the reel due to undulations of the release surface 114A.

When the recording tape cartridge 10 is loaded into the drive device, the recording tape cartridge 10 moves downward, and relatively approaches the rotating shaft 100. In this way, the driving gear 108 of the rotating shaft 100 meshes with the reel gear 42 which is exposed from the gear opening 20, and the reel plate 54 is attracted by the magnet 110 of the rotating shaft 100 in a state of being slightly set apart therefrom, and the reel 28 is held at the rotating shaft 100.

Accompanying this meshing operation, the rotating shaft 100 moves upward relative to the case 12. In this way, the press operation surface 86C of the clutch member 84 is pressed by the release surface 114A of the pressing bolt 112 (the portion of the rotating shaft 100 which has entered in further toward the radial direction inner side than the reel gear 42), and moves upward, and the braking member 60 moves to the rotation permitted position. In this way, accompanying the operation of the driving gear 108 meshing with the reel gear 42, the reel 28 rises upward within the case 12 against the urging force of the compression coil spring 82 (i.e., the lower flange 38 is moved away from the annular rib 22), the state in which rotation is impeded by the braking member 60 is released, and the reel 28 becomes able to rotate within the case 12.

In the state in which the reel gear 42 is meshed with the driving gear 108, the state of abutment between the release surface 114A and the press operation surface 86C of the clutch member 84 is maintained, and the braking member 60 is held at the rotation permitted position. When the reel 28 rotates, there is no relative rotation between the clutch member 84, which rotates integrally with the reel 28, and the rotating shaft 100, which drives the reel 28, and the press operation surface 86C and the release surface 114A do not slidingly contact one another. The slide-contact surface 86A of the clutch member 84 and the slide-contact projection 70 of the braking member 60, which cannot rotate with respect to the case 12, slidingly contact one another.

At the above-described clutch member 84, the upper portion (the base portion) of the clutch main body 86 which has the slide-contact surface 86A abutting the braking member 60 and which is positioned within the reel hub 32 (within the cylindrical portion 34 including the plate thickness portion of the bottom portion 36), and the seat ribs 92 (the stopper portions) which extend from the clutch main body, correspond to the "main body portion" in the present invention. The lower side portion of the clutch main body 86 which has the press operation surface 86C which is exposed so as to be able to be operated by the rotating shaft 100 (i.e., the portion of the clutch main body 86 which is provided so as to be continuous with the base portion) corresponds to the "operation portion" in the present invention.

Next, operation of the present embodiment will be described.

When the recording tape cartridge 10 having the above-described structure is not being used, due to the urging force of the compression coil spring 82, the braking member 60 is positioned at the rotation locked position, and the braking gear 66 is meshing with the engaging gear 44. Therefore, rotation of the reel 28 with respect to the case 12 is impeded. At this time, the reel gear 42 of the reel 28 is exposed from the gear opening 20, and the clutch main body 86 of the clutch member 84 is inserted through the pass-through hole 50 and the through hole 54A and faces the gear opening 20.

On the other hand, when the magnetic tape T is to be used, the recording tape cartridge 10 is loaded into a bucket (not illustrated) of a drive device along the direction of arrow A. When the recording tape cartridge 10 is loaded to a predetermined depth in the bucket, the bucket is lowered. The rotating shaft 100 of the drive device relatively approaches the gear opening 20 of the case 12 (i.e., relatively moves upward), and holds the reel 28. Specifically, while the reel plate 54 is attracted and held by the magnet 110 in a non-contact state, the driving gear 108 of the rotating shaft 100 meshes with the reel gear 42.

Accompanying this meshing of the reel gear 42 and the driving gear 108, i.e., the relative movement of the rotating shaft 100 in the axial direction toward the side near the case 12, the release surface 11 4A (the pressing bolt 112) of the rotating shaft 100 abuts the press operation surface 86C of the clutch member 84, and presses it. Due to this pressing force, the clutch member 84 moves upward in the axial direction of the reel 28 against the urging force of the compression coil spring 82, while the rotation restricting ribs 88 are guided by the rotation restricting grooves 90. In this way, the braking member 60, which is abutting the clutch member 84 at the slide-contact projection 70, also moves upward, and the meshing of the engaging gear 44 and the braking gear 66 of the braking member 60 is released. Namely, the braking member 60 reaches the position where relative rotation with respect to the reel 28 is permitted.

When the rotating shaft 100 moves relatively further upward, the reel 28 is raised up together with the clutch member 84 and the braking member 60 (i.e., with their relative positions unchanged) against the urging force of the compression coil spring 82. The braking member 60 reaches the absolute rotation permitted position (the position where rotation with respect to the case 12 is permitted), and the lower flange 38 moves away from the annular rib 22 (the taper surface 22A). In this way, the reel 28 rises up within the case 12, and becomes able to rotate in a state of not contacting the inner surfaces of the case 12.

Due to the lowering of the bucket, i.e. the recording tape cartridge 10, within the drive device, the positioning pins of the drive device enter into the positioning holes 24, 26 of the case 12, and the positioning surfaces of the drive device abut the positioning surfaces 24A, 26A of the case 12. In this way, the recording tape cartridge 10 is positioned in the horizontal direction and the vertical direction with respect to the drive device.

Then, the pull-out means of the drive device pulls the leader block 30 out from the case 12 and guides the leader block 30 to the take-up reel of the drive device, while a pull-out pin (not illustrated) of the pull-out means engages with the engaging recess 30A of the leader block 30. Then, the leader block 30 is fit into the take-up reel, and the arc-shaped surface 30B forms a portion of the take-up surface on which the magnetic tape T is taken up.

When the leader block 30 rotates integrally with the take-up reel in this state, the magnetic tape T is pulled-out from the case 12 through the opening 18 while being taken-up onto the reel hub of the take-up reel. At this time, the reel 28 of the recording tape cartridge 10 rotates synchronously with the take-up reel due to the torque of the rotating shaft 100 which is transmitted by the driving gear 108 which meshes with the reel gear 42.

Information is recorded onto the magnetic tape T or information recorded on the magnetic tape T is played back by a recording/playback head disposed along a predetermined tape path of the drive device. At this time, the slide-contact projection 70 of the braking member 60, which cannot rotate with respect to the case 12, slidingly contacts the slide-contact surface 86A of the clutch member 84 which rotates together with the reel 28 with respect to the case 12.

On the other hand, when the magnetic tape T is rewound onto the reel 28 and the leader block 30 is held in a vicinity of the opening 18 of the case 12, the bucket in which the magnetic tape cartridge 10 is loaded is raised. Thus, the meshing of the reel gear 42 and the driving gear 108 is cancelled, the abutment of the release surface 114A and the press operation surface 86C of the clutch member 84 is released, and the clutch member 84 is moved downward, together with the braking member 60 (with the state of abutment between the clutch member 84 and the braking member 60 maintained), by the urging force of the compression coil spring 82.

In this way, the seat ribs 92 of the clutch member 84 abut the stopper surfaces 94A, and the braking gear 66 of the braking member 60 meshes with the engaging gear 44. Namely, the braking member 60 is returned to the rotation locked position at which the braking member 60 impedes rotation of the reel 28 with respect to the case 12. Moreover, as the braking member 60 and the clutch member 84 move due to the urging force of the compression coil spring 82, the reel 28 also moves downward. The reel gear 42 is returned to its initial state of being exposed from the gear opening 20, while the lower flange 38 of the reel 28 is made to abut the annular rib 22. In this state, the recording tape cartridge 10 is discharged from the bucket.

Here, the recording tape cartridge 10 has the guide mechanism which is structured by the rotation restricting ribs 88 of the clutch member 84 and the rotation restricting grooves 90 of the reel 28. Therefore, when the clutch member 84 is pushed by the rotating shaft 100 (the release surface 114A) of the drive device, the clutch member 84 is reliably operated and cancels the rotation locked state of the reel 28. Further, the rotation restricting ribs 88, which structure the guide mechanism, are provided at the bottom portion 36 further toward the radial direction inner side than the reel gear 42, and the press operation surface 86C of the clutch member 84 passes through the pass-through hole 50, which is positioned further toward radial direction inner side than the reel gear 42, and is exposed to the exterior. Therefore, there is no need to provide, at the reel gear 42, discontinuous portions for operating and guiding the releasing member (portions corresponding to the insert-through holes 256 of the conventional recording tape cartridge 250), and a structure in which the reel gear 42 is formed continuously in an annular form is realized. In this way, there is an improvement in the torque transmitted from the driving gear 108 to the reel 28, and strength of the reel gear 42 with respect to this torque is ensured.

Moreover, at the time when the rotation locked state of the reel 28 is released, the portion which abuts the press operation surface 86C is not the driving gear 108. Therefore, the stroke of movement of the clutch member 84 is not restricted by the height of the teeth of the reel gear 42 (the driving gear 108), and a sufficient release stroke can be ensured. In addition, the release surface 114A, which does not have the function of meshing with the reel gear 42, is formed as a flat surface, and, at the time of releasing the locking, presses the flat press operation surface 86C in a state in which these surfaces planarly contact one another. Therefore, wear does not arise at the press operation surface 86C, which is made of resin, due to this pushing (being repeated). Further, when the reel 28 rotates, the clutch member 84 rotates together with the rotating shaft 100. Therefore, no wear arises at the press operation surface 86C accompanying this rotation. Thus, the release stroke is not reduced due to wear of the clutch member 84, and in the present embodiment, the release stroke is substantially equivalent to the height of the teeth of the reel gear 42. It goes without saying that wear does not arise at the release surface 114A which is made of metal.

In the recording tape cartridge 10, the guide mechanism is structured by the rotation restricting ribs 88, which jut outwardly in the radial direction from the clutch main body 86, being disposed in the rotation restricting grooves 90 whose longitudinal direction is the axial direction of the reel 28. Therefore, the structure of the guide mechanism is simple. Further, due to this structure, at the clutch member 84, a structure is realized in which the rotation restricting ribs 88 are provided independently from the press operation surface 86C (the lower portion of the clutch main body 86) which serves as the operation portion. Constraints on the structure (the design), such as forming the clutch main body 86 in the shape of a detent, providing a plurality of operation portions (portions corresponding to the leg portions 254 in the conventional recording tape cartridge 250), or the like, are suppressed. Moreover, in the structure in which the insert-through holes 256, which pass through the bottom portion 210A, are the guide portions as in the conventional art, there are fewer constraints on the guide stroke which is dependent on the plate thickness of the bottom portion 210A. Therefore, in the present embodiment, the boss portion 52 for a clutch stands erect from the bottom portion 36, the guide stroke and the amount of engagement of the rotation restricting ribs 88 and the rotation restricting grooves 90 is large, and a structure is realized in which the guide mechanism is on the whole housed within the reel hub 32. In this way, by providing the rotation restricting ribs 88 and the rotation restricting grooves 90, the degrees of freedom in design increase, and various types of preferable structures are realized.

In the recording tape cartridge 10, three of the rotation restricting ribs 88 are provided at different positions in the peripheral direction of the clutch main body 86. The rotation restricting grooves 90, in which respectively different rotation restricting ribs 88 are engageably inserted, are provided at positions in the peripheral direction of the boss portion 52 for a clutch (the reel 28) which positions correspond to the rotation restricting ribs 88. Therefore, movement of the clutch member 84 in each direction orthogonal to the axis is suitably restricted. Specifically, due to the clearance C1, the clutch member 84 can move in each direction orthogonal to the axis thereof. However, the plural rotation restricting ribs 88 are provided along directions which intersect one another as seen along the axial direction. Therefore, the clearances between the respective rotation restricting ribs 88 and rotation restricting grooves 90 are disposed along directions which intersect one another, and there is little difference in the amounts over which movement is possible in the aforementioned respective directions. As a result, for example, even if the clutch member 84 attempts to move in the direction in which one of the rotation restricting ribs 88 juts out (i.e., in a direction orthogonal to the clearance C1), the other rotation restricting ribs 88 abut the groove walls of the rotation restricting grooves 90 and keep that amount of movement small. In this way, the displacement of the clutch member 84 in the aforementioned respective directions is suppressed, and the clutch member 84 shaking the braking member 60, which slidingly contacts the clutch member 84 when the reel rotates 28, is suppressed, and wear between the clutch member 84 and the braking member 60 is suppressed.

Moreover, when the reel 28 rotates, the receipt of the torque transmitted from the reel 28 to the rotation restricting ribs 88 is apportioned among the respective rotation restricting ribs 88. Therefore, the stress applied to each of the rotation restricting ribs 88 is mitigated. In particular, because the rotation restricting ribs 88 are disposed at uniform intervals in the peripheral direction, the torque received by each of the rotation restricting ribs 88 is uniform, and the posture of the clutch member 84 is stable. Moreover, as compared with a structure in which four or more of each of the rotation restricting ribs 88 and the rotation restricting grooves 90 are provided, the structure (configuration) is simple. For example, the structures of the molds of the reel hub 32 and the clutch member 84, which are respectively formed by resin molding, are simple. This structure is particularly suited to the clutch member 84 which is disposed at the axially central portion of the reel hub 32 and is relatively small.

Here, at the clutch member 84, the seat ribs 92 are provided separately from the rotation restricting ribs 88, and the guiding/rotation restricting function and the positioning function (the function of restricting movement in the directions in which movement is permitted) are structured separately at the clutch member 84. Therefore, at the clutch member 84 and the boss portion 52 for a clutch, there are no constraints for achieving both of the aforementioned functions. Further, at the recording tape cartridge 10, the rotation restricting ribs 88, at which rigidity with respect to the urging force of the compression coil spring 82 is not required, are made to be thin, the dimensional accuracy in the direction of thickness resulting from the resin molding is improved, and the aforementioned guiding function is improved. Moreover, the rotation restricting ribs 88 which are thin are made to be long in the direction of movement (the up-down direction), and the amount of engagement thereof with the rotation restricting grooves 90 is increased. In this way, the aforementioned guiding function is further improved, and the stress applied to the respective rotation restricting ribs 88 when the reel 28 rotates is mitigated. On the other hand, the seat ribs 92, of which a guiding function is not required, i.e., of which high dimensional accuracy in the thickness direction is not required, are formed to be thick, and sufficient rigidity thereof with respect to the urging force of the compression coil spring 82 is ensured. Further, the seat ribs 92 are made to be short in the up-down direction, and effects of poor resin flowability at the time of molding (which effects accompany the forming of the seat ribs 92 to be thick) are suppressed.

In addition, because three of the seat ribs 92 are provided at uniform intervals in the peripheral direction, the posture of the clutch member 84 at the time of positioning thereof (i.e., at the time of locking the rotation of the reel 28) is stable. Namely, tilting of the clutch member 84 with respect to the axial direction of the reel 28 at the time when the clutch member 84 is positioned is suppressed. The clutch member 84 having a stable posture is pressed by the rotating shaft 100, and can reliably release the locked state of the reel 28. Further, as compared with a structure in which four or more of the seat ribs 92 are provided, the structure (configuration) is simple. For example, the structure of the mold in a case in which the releasing member is formed by die casting is simple. This structure is particularly suited to the clutch member 84 which is disposed at the axially central portion of the reel hub 32 and is relatively small.

Here, the clutch member 84 is disposed at the axially central portion of the reel hub 32 and passes through the pass-through hole 50 such that the press operation surface 86C is exposed. Therefore, there is no need to provide a hole corresponding to the through hole 54A, in the vicinity of the outer periphery (where the holding effect is great) of the reel plate 54 which is attracted and held by the magnet 110. Therefore, there is no reduction in the holding force due to the provision of the clutch member 84, and no need for a countermeasure to such a reduction in holding force. Further, at the drive device, the axially central portion, which does not contribute to the aforementioned holding force, can be structured by a member other than the magnet 110 in accordance with the through hole 54A of the reel plate 54. The release surface 114A which planarly contacts the flat press operation surface 86C is finished to a degree of flatness which is equivalent to or greater than that of the magnet 110. In this way, due to the release surface 114A of the rotating shaft 100, the locked state of the reel 28 can be stably released while tilting of the clutch member 84 with respect to the axial direction is suppressed. Moreover, because the release surface 114A does not slidingly contact the press operation surface 86C which is formed of resin, the release surface 114A is formed at the head portion 114 of the presser bolt 112 which is formed of metal, and the rotating shaft 100 is simplified. Moreover, constraints on the drive device (the layout of the motor or the like) such as in a case in which the resin releasing portion 212B is fastened by a screw from the motor side as in the conventional art, can be eliminated.

The clutch member 84, which is disposed at the axially central portion of the reel hub 32, and the boss portion 52 for a clutch are disposed further toward the radial direction inner side than the engaging gear 44. Therefore, in a structure having the clutch member 84, a structure in which the engaging gear 44 is formed continuously in an annular form is realized. Therefore, the function of centering the braking member 60 by the engaging gear 44 is improved, and it is possible to prevent the braking member 60 from riding on the addenda of the engaging gear 44 at the time when the braking member 60 is assembled. Further, the amount of meshing of the braking gear 66 and the engaging gear 44 is increased, and the ability of the braking member 60 to brake the reel 28 is improved. In this way, the amount of engagement per tooth of the braking gear 66 and the engaging gear 44 can be reduced and the release stroke can be shortened, and the urging force of the compression coil spring 82 can be reduced and the strength required of the respective portions can made smaller (there is leeway with respect to strength).

At the radial direction inner side of the engaging gear 44, the braking member 60 is provided with the tubular portion 62A into which the upper portion of the clutch member 84 is inserted, and into which the boss portion 52 for a clutch is inserted mainly when the braking member 60 is positioned at the rotation locked position. Therefore, constraints on the height of the engagement of the braking member 60 and the engaging gear 44, which constraints would otherwise be caused by the provision of the clutch member 84, are eliminated. Namely, a structure is realized in which the braking gear 66, which is provided at the ring portion 64 which extends toward the radial direction outer side of the tubular portion 62A, is made to mesh with the engaging gear 44 at a desired height. In the present embodiment, the position at which the braking gear 66 of the braking member 60 and the engaging gear 44 of the reel 28 mesh with one another is in a vicinity of the position of the center of gravity in the heightwise direction of the reel 28. In this way, the braking member 60 stably impedes rotation of the reel 28, and the ability of the braking member 60 to brake the reel 28 is further improved. In addition, the thickness of the pedestal portion 46 at which the engaging gear 44 is formed is reduced, and the moldability at the time of molding the reel hub 32 which is formed by resin molding is improved.

In this way, in the recording tape cartridge 10 relating to the present embodiment, the locking of the reel 28 by the braking member 60 and the releasing of the locking by the clutch member 84 can be reliably carried out, and structural constraints caused by the provision of the clutch member 84 can be suppressed.

Note that, in the above-described embodiment, the clutch member 84 is a preferable structure in which the press operation portion 86C, which serves as the operation portion, is disposed at the axially central portion of the reel hub 32. However, the present invention is not limited to the same. For example, the clutch member 84 may be structured such that one or a plurality of operation portions face the gear opening 20 from a region other than the axially central portion of the reel hub 32, and can be operated from the exterior. Moreover, in the present embodiment, the lower portion of the clutch main body 86, which is the operation portion at the clutch member 84, and the rotation restricting ribs 88 which are the guide members are structured separately. However, the present invention is not limited to the same, and the operation portion and the guide member may be structured so as to be integral. In addition, the present invention is not limited to the preferable structure in which the seat ribs 92 serving as stopper portions jut outwardly in the radial direction from the clutch main body 86. Accordingly, for example, the clutch member 84 may be formed in a shape such as that of the conventional releasing member 252, and the three leg portions 254, which integrate the operation portion and the guide members, may be disposed in pass-through holes which serve as guide portions and pass through the bottom portion 36 and the reel plate 54, and the main body portion itself, which is substantially triangular in plan view, may serve as the stopper portion. Namely, the present invention is not limited to a structure in which the guide portions and the guide members are guide grooves and engaging pieces, nor to a structure in which the operation portion is exposed from the axially central portion of the reel hub.

The above-described embodiment is a preferable structure in which the rotation restricting ribs 88 and the seat ribs 92 are provided separately. However, the present invention is not limited to the same. For example, the rotation restricting ribs 88 may be structured so as to also exhibit the function of positioning the clutch member 84. Accordingly, the present invention is not limited by the thickness and the length of the rotation restricting ribs 88, nor by the thickness and the length of the seat ribs 92. Moreover, it goes without saying that the present invention is not limited by the numbers of the rotation restricting ribs 88, the rotation restricting grooves 90, and the seat ribs 92. In addition, it goes without saying that the seat ribs 92 are not limited to the structure of entering in the stopper grooves 94.

The above-described embodiment is a preferable structure in which the clutch member 84 is disposed so as to pass through the pass-through hole 50. However, the present invention is not limited to the same. For example, the clutch member 84 may on the whole be disposed within the reel hub 32, and may be pressed and operated by a releasing portion of the drive device which enters into the pass-through hole 50. Further, the present invention is not limited to the structure in which clutch member 84 is pressed by the release surface 114A of the head portion 114 which structures the rotating shaft 100. For example, the clutch member 84 may be pushed by the magnet 110 or the like.

The above-described embodiment is a preferable structure in which the clutch member 84 is on the whole disposed further toward the radial direction inner side than the engaging gear 44. However, the present invention is not limited to the same. A portion of the engaging gear 44 in the peripheral direction may be cut-out, and a portion of the clutch member 84 may be disposed at this cut-out portion. Accordingly, the present invention is not limited to the preferable structure in which the braking member 60 has the tubular portion 62A (the main body portion 62). For example, the braking member may be structured by providing the braking gear 66, the cross-shaped projection 72, and the slide-contact projection 70 at a disc-shaped member.

Note that, in the above-described embodiment, the recording tape cartridge 10 is structured so as to have the leader block 30. However, the present invention is not limited by the configuration of the case 12, the structure for pulling-out the magnetic tape T (the structure of the leader member), the structure for opening and closing the opening 18, and the like. Accordingly, for example, the recording tape cartridge 10 may be structured such that a small, solid-cylindrical leader pin is attached as a leader member to the distal end of the magnetic tape T, or may be structured so as to have a shielding member which opens and closes the opening 18 (a sliding door or the like which moves along a predetermined straight line or arc).

In addition, the magnetic tape T is used as the recording tape in the above-described embodiment. However, the present invention is not limited to the same. It suffices for the recording tape to be interpreted as an information recording/playback medium which is shaped as an elongated tape and on which information can be recorded and from which recorded information can be played back. It goes without saying that the recording tape cartridge relating to the present invention can be applied to recording tapes of any recording/playback systems.

As described above, the recording tape cartridge relating to the present invention has the excellent effects that the locking of a reel by a braking member and the releasing of the locking by a releasing member can be reliably carried out, and structural constraints due to the provision of the releasing member can be suppressed.

What is claimed is:

1. A recording tape cartridge comprising:
   a reel rotatably accommodated within a case, a recording tape being wound around an outer peripheral portion of a reel hub which is formed in a shape of a cylindrical tube having a bottom portion;
   an engaging portion provided at an inner surface of the bottom portion of the reel hub;
   a reel gear which is annular, and which is provided coaxially at an outer surface of the bottom portion of the reel hub, and which can mesh with a driving gear of a drive device;
   a braking member, provided so as to be unable to rotate within the case, able to move to a rotation locked position at which the braking member engages with the engaging portion, and to a rotation permitted position, at which an engaged state with the engaging portion is released by the braking member being away from the bottom portion of the reel hub;
   a releasing member having a main body portion positioned within the reel hub, and an operation portion provided at the main body portion and exposed, from a position further toward a radial direction inner side than the reel gear at the bottom portion of the reel hub, to an exterior, the releasing member moving the braking member to the rotation permitted position by the operation portion being pushed by a releasing portion of the drive device;
   a guide portion provided, at the bottom portion of the reel hub, further toward the radial direction inner side than the reel gear;
   a guide member, provided at the releasing member, for guiding the releasing member in a moving direction along an axial direction of the reel and for impeding rotation of the releasing member with respect to the reel by engaging with the guide portion; and
   a pass-through hole (50), formed in an axially central portion of the bottom portion of the reel hub, from which the operation portion is exposed to the exterior,
   wherein the guide member is an engaging piece protruding from the main body portion toward a radial direction outer side, and
   the guide portion is a guide groove in which the engaging piece enters, the guide groove being formed at the bottom portion of the reel hub so as to extend in the moving direction and toward the radial direction outer side from the pass-through hole (50).

2. The recording tape cartridge of claim 1, wherein three or more of each of the engaging piece and the guide groove are provided at respectively different positions in a peripheral direction.

3. The recording tape cartridge of claim 2, wherein
   the main body portion has a base portion which can pass through the pass-through hole and at which the operation portion and the engaging piece are provided, and
   a stopper portion protruding outwardly in a radial direction from the base portion separately from the engaging piece and engageable with the bottom portion of the reel hub.

4. The recording tape cartridge of claim 1, wherein the main body portion has a base portion which can pass through the pass-through hole and at which the operation portion and the engaging piece are provided, and a stopper portion protruding outwardly in a radial direction from the base portion separately from the engaging piece and engageable with the bottom portion of the reel hub.

5. The recording tape cartridge of claim 4, wherein three or more of the stopper portion are provided at uniform intervals in the peripheral direction.

6. The recording tape cartridge of claim 5, wherein the engaging piece is thinner than the stopper portion.

7. The recording tape cartridge of claim 4, wherein the engaging piece is thinner than the stopper portion.

8. The recording tape cartridge of claim 7, wherein a length, in the moving direction, of the engaging piece is longer than a length, in the moving direction, of the stopper portion.

9. The recording tape cartridge of claim 4, wherein a press operation surface, which is pushed by the releasing portion, is provided at a bottom portion of the operation portion, and the press operation surface is a flat surface.

10. The recording tape cartridge of claim 4, wherein the engaging portion is provided along a circumference which is coaxial with the reel, and the releasing member and the guide portion are disposed at a radial direction inner side of the engaging portion.

11. The recording tape cartridge of claim 4, wherein a stopper groove portion, provided at the bottom portion of the reel hub, further toward the radial direction inner side than the reel gear, in which the stopper portion enters and which in the moving direction, is provided.

12. The recording tape cartridge of claim 11, wherein a clearance between the stopper groove portion and the stopper portion in a state of engaging is larger than a clearance between the guide groove and the engaging piece in a state of engaging.

13. A recording tape cartridge comprising:
a reel rotatably accommodated within a case, a recording tape being wound around an outer peripheral portion of a reel hub which is formed in a shape of a cylindrical tube having a bottom portion:
an engaging portion provided at an inner surface of the bottom portion of the reel hub;
a reel gear which is annular, and which is provided coaxially at an outer surface of the bottom portion of the reel hub and which can mesh with a driving gear of a drive device;
a braking member, provided so as to be unable to rotate within the case, able to move to a rotation locked position at which the braking member engages with the engaging portion, and to a rotation permitted position, at which an engaged state with the engaging portion is released by the braking member being away from the bottom portion of the reel hub;
a releasing member having a main body portion positioned within the reel hub, and an operation portion provided at the main body portion and exposed, from a position further toward a radial direction inner side than the reel gear at the bottom portion of the reel hub, to an exterior, the releasing member moving the braking member to the rotation permitted position by the operation portion being pushed by a releasing portion of the drive device;
a guide portion provided, at the bottom portion of the reel hub, further toward the radial direction inner side than the reel gear; and
a guide member, provided at the releasing member, for guiding the releasing member in a moving direction along an axial direction of the reel and for impeding rotation of the releasing member with respect to the reel by engaging with the guide portion,
wherein the guide member is an engaging piece protruding from the main body portion toward a radial direction outer side, and the guide portion is a guide groove in which the engaging piece enters and which extends in the moving direction,
wherein the engaging portion is provided along a circumference which is coaxial with the reel, and the releasing member and the guide portion are disposed at a radial direction inner side of the engaging portion,
wherein a tubular portion, into which the releasing member and the guide member enter, is provided at an axially central portion of the braking member at the radial direction inner side of the engaging portion.

14. A recording tape cartridge comprising:
a reel rotatably accommodated within a case, a recording tape being wound around an outer peripheral portion of a reel hub which is formed in a shape of a cylindrical tube having a bottom portion;
an engaging portion provided at an inner surface of the bottom portion of the reel hub;
a reel gear which is annular, and which is provided coaxially at an outer surface of the bottom portion of the reel hub, and which can mesh with a driving gear of a drive device;
a braking member, provided so as to be unable to rotate within the case, able to move to a rotation locked position at which the braking member engages with the engaging portion, and to a rotation permitted position, at which an engaged state with the engaging portion is released by the braking member being away from the bottom portion of the reel hub;
a releasing member having a main body portion positioned within the reel hub, and an operation portion provided at the main body portion and exposed, from a position further toward a radial direction inner side than the reel gear at the bottom portion of the reel hub, to an exterior, the releasing member moving the braking member to the rotation permitted position by the operation portion being pushed by a releasing portion of a drive device;
a boss portion, provided at the inner surface of the bottom portion of the reel hub, further toward the radial direction inner side than the reel gear, which includes a hole, the operation portion of the releasing member being able to pass through the hole and expose to the exterior of the outer surface of the reel hub; and
a guide member, provided at the releasing member, for guiding the releasing member in a moving direction along an axial direction of the reel and for impeding rotation of the releasing member with respect to the reel by engaging with the boss portion, wherein the guide member is an engaging piece protruding from the main body portion toward a radial direction outer side, and wherein a groove, in which the engaging piece enters and which extends in the moving direction, is formed at the hole of the boss portion.

15. The recording tape cartridge of claim 14, wherein the engaging portion is provided along a circumference which is coaxial with the reel, and the releasing member and the guide portion are disposed at a radial direction inner side of the engaging portion.

16. The recording tape cartridge of claim 14, wherein a press operation surface, which is pushed by the releasing portion, is provided at a bottom portion of the operation portion, and the press operation surface is a flat surface.

17. The recording tape cartridge of claim 14, wherein a plurality of each of the engaging piece and the groove are provided at different positions in peripheral directions of the releasing member and the hole of the boss portion, respectively.

* * * * *